US008932044B2

(12) United States Patent
Boegli

(10) Patent No.: US 8,932,044 B2
(45) Date of Patent: Jan. 13, 2015

(54) FOIL EMBOSSING DEVICE

(75) Inventor: Charles Boegli, Marin-Epagnier (CH)

(73) Assignee: Boegli-Gravures S.A., Marin (CH)

( * ) Notice: Subject to any disclaimer, the term of this patent is extended or adjusted under 35 U.S.C. 154(b) by 0 days.

(21) Appl. No.: 13/700,950

(22) PCT Filed: Jun. 16, 2011

(86) PCT No.: PCT/EP2011/060047
§ 371 (c)(1), (2), (4) Date: Nov. 29, 2012

(87) PCT Pub. No.: WO2011/161002
PCT Pub. Date: Dec. 29, 2011

(65) Prior Publication Data

US 2013/0069276 A1 Mar. 21, 2013

(30) Foreign Application Priority Data

Jun. 22, 2010 (EP) .................................... 10166793

(51) Int. Cl.
*B31D 1/00* (2006.01)
*B29C 59/04* (2006.01)
*B31F 1/07* (2006.01)

(52) U.S. Cl.
CPC ... *B31D 1/00* (2013.01); *B31F 1/07* (2013.01); *B31F 2201/0733* (2013.01); *B31F 2201/0743* (2013.01); *B31F 2201/0753* (2013.01)
USPC ....... 425/436 R; 425/363; 425/367; 425/385; 264/293; 264/288.8

(58) Field of Classification Search
USPC ..................... 425/343, 363, 367, 385, 436 R; 264/284, 293
See application file for complete search history.

(56) References Cited

U.S. PATENT DOCUMENTS 2,958,094 A * 11/1960 Curletti ......................... 425/294
3,608,047 A * 9/1971 Wiggins ........................ 264/286

(Continued)

FOREIGN PATENT DOCUMENTS

| | | | |
|---|---|---|---|
| EP | 2 027 994 A2 | 2/2009 |
| WO | WO 02/076716 | 10/2002 |
| WO | WO 2009/113115 A1 | 9/2009 |

OTHER PUBLICATIONS

International Search Report issued in PCT/EP2011/060047, completed Dec. 22, 2011.

*Primary Examiner* — Joseph S. Del Sole
*Assistant Examiner* — Nahida Sultana
(74) *Attorney, Agent, or Firm* — Foley & Lardner LLP

(57) ABSTRACT

The foil embossing device comprises an embossing roller and two counter-rollers, one of the rollers being driven by a drive and the rollers having a configuration where the teeth, rings, or ridges project from the base cylinder, at least the embossing roller having teeth that project from the base cylinder and at least partly also serve for driving the counter-roller. To increase the uniformity of the embossing of the foil, the embossing roller has a diameter that is reduced by 0.02 to 0.20 mm over a certain length that is at least the same as the width of the foil. The length of the reduced diameter is preferably chosen so as to exceed the width of the foil being printed. Due to this depression, such a device allows a perfectly uniform embossing of foils of any kind independently of the design of the embossing rollers.

17 Claims, 20 Drawing Sheets

(56) References Cited

U.S. PATENT DOCUMENTS

| | | | | |
|---|---|---|---|---|
| 3,611,919 | A * | 10/1971 | Thomas | 101/23 |
| 4,732,082 | A * | 3/1988 | Ireton | 101/23 |
| 5,007,271 | A | 4/1991 | Boegli | |
| 5,443,379 | A * | 8/1995 | Hsu et al. | 425/335 |
| 5,913,765 | A * | 6/1999 | Burgess et al. | 493/403 |
| 6,176,819 | B1 * | 1/2001 | Boegli et al. | 493/355 |
| 6,203,308 | B1 * | 3/2001 | Huang | 425/363 |
| 6,665,998 | B1 * | 12/2003 | Boegli | 53/131.4 |
| 6,715,411 | B1 | 4/2004 | Boegli | |
| 7,036,347 | B2 | 5/2006 | Boegli | |
| 7,452,200 | B2 * | 11/2008 | McCaw et al. | 425/237 |
| 7,767,126 | B2 * | 8/2010 | Kang et al. | 264/220 |
| 7,789,652 | B2 * | 9/2010 | Johnson | 425/343 |
| 8,430,663 | B2 * | 4/2013 | Boegli | 425/369 |
| 8,495,900 | B2 * | 7/2013 | Boegli | 72/39 |
| 2004/0159977 | A1 * | 8/2004 | Perfetto et al. | 264/293 |
| 2005/0280182 | A1 | 12/2005 | Boegli | |
| 2006/0286343 | A1 * | 12/2006 | Curro et al. | 428/131 |
| 2007/0212966 | A1 * | 9/2007 | Wittner et al. | 442/328 |
| 2007/0289701 | A1 * | 12/2007 | Boegli | 156/209 |
| 2008/0241305 | A1 * | 10/2008 | Fiedler | 425/367 |
| 2009/0050001 | A1 | 2/2009 | Boegli | |
| 2011/0156292 | A1 * | 6/2011 | Yu et al. | 264/1.6 |

* cited by examiner

*Fig. 11*
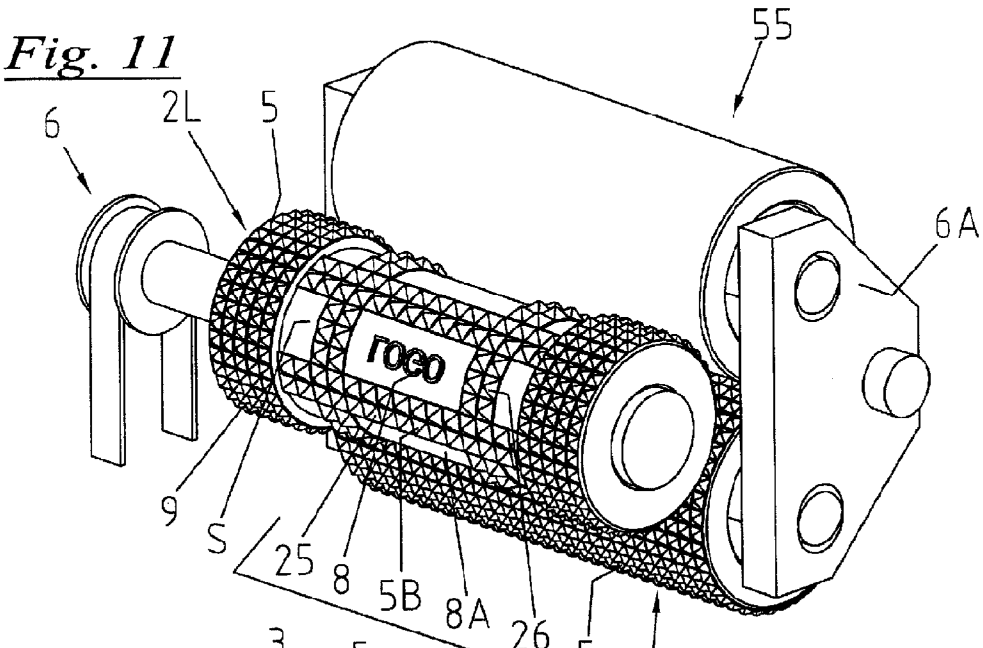
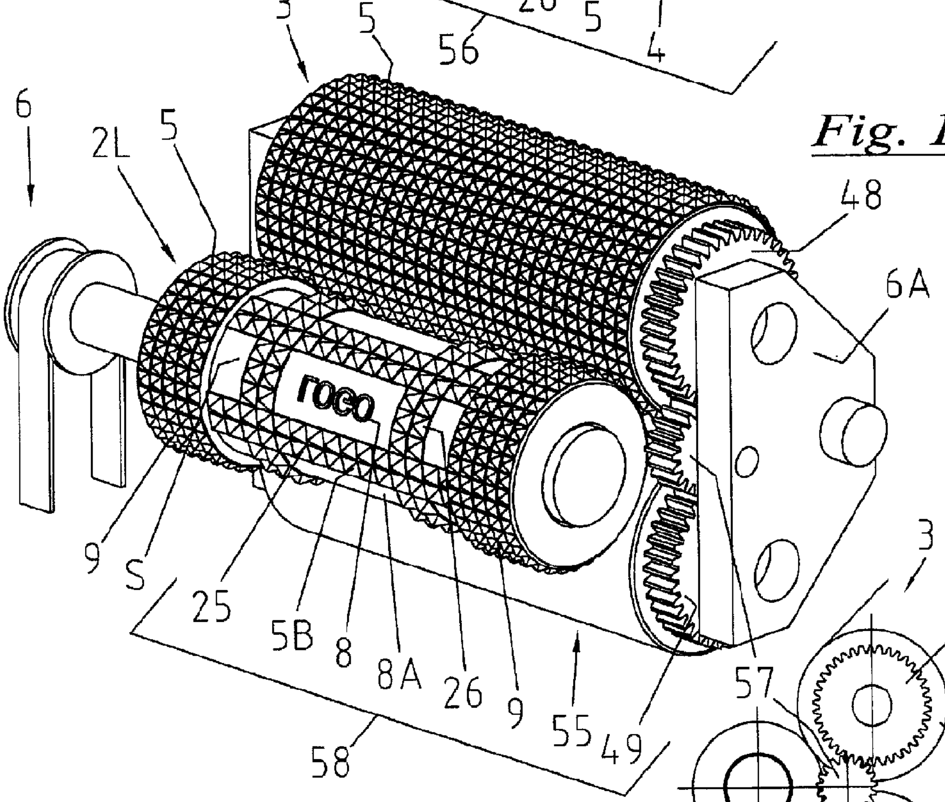
*Fig. 12*
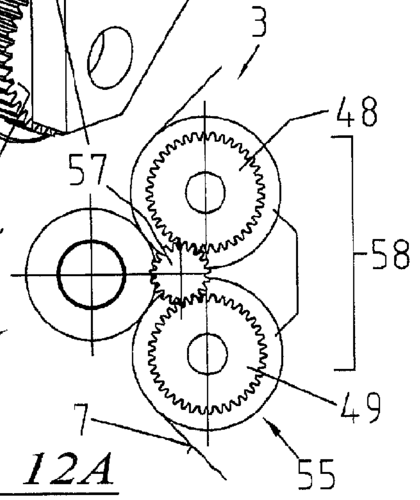
*Fig. 12A*

8
7d
7
8a
4L
25
26
5
9
LOGO
4L f
S
Sd
5S
91
4L g
4L h
92
4L i
93
4L k

*Fig. 25*
*Fig. 25A*
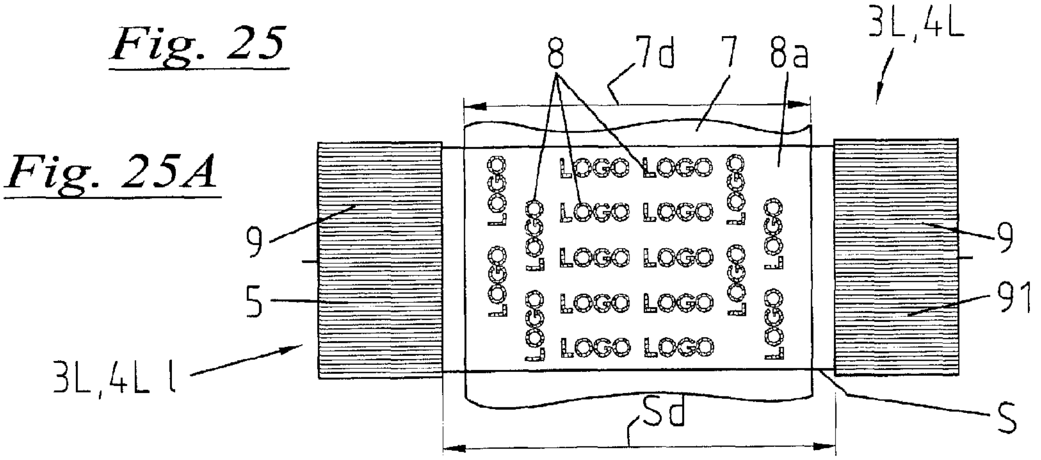
*Fig. 25B*
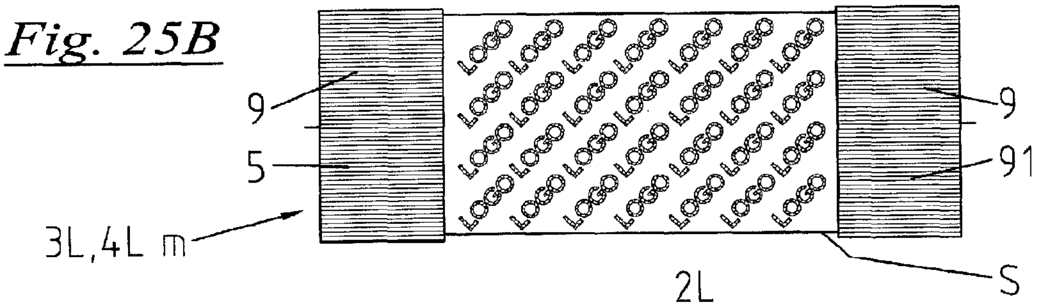
*Fig. 25C*
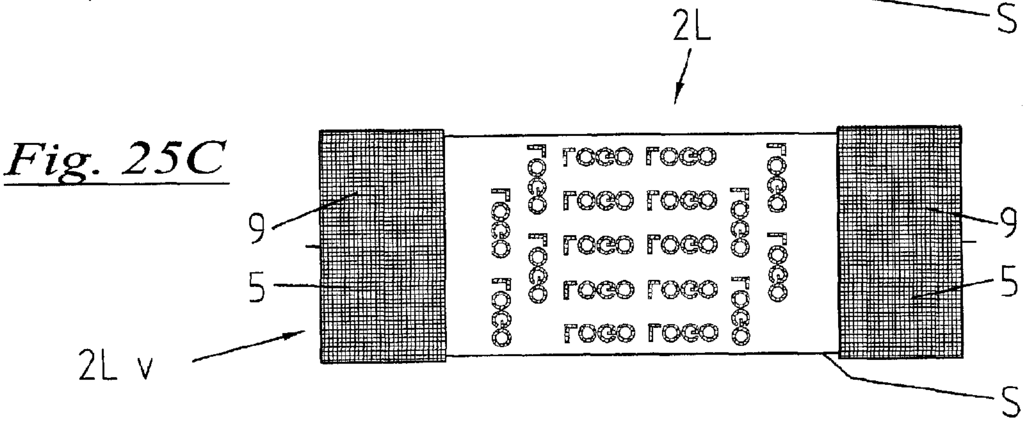
*Fig. 25D*
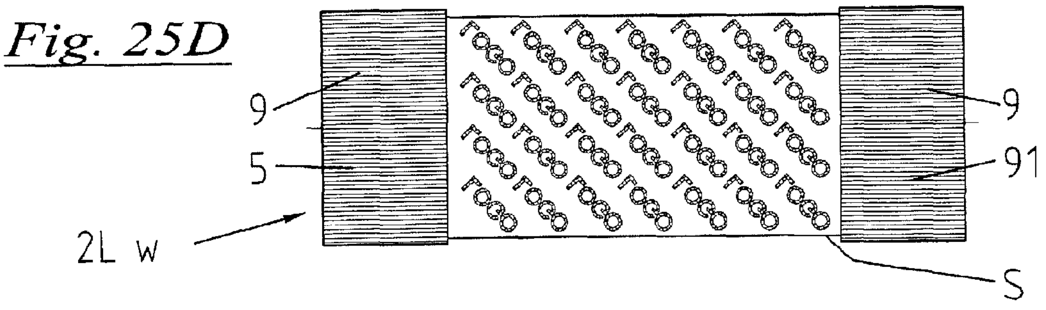

FOIL EMBOSSING DEVICE

The present patent application relates to a device for embossing foils comprising at least one embossing roller and at least one counter-roller, one roller being driven via a drive and the rollers having a configuration where teeth, rings, or ridges project form a base cylinder, at least the embossing roller having teeth that project from the base cylinder and at least partly serve for driving the one or more counter-rollers, and to uses of the device for embossing packaging foils for cigarettes and wrapping foils having reinforced areas, e.g. for boxes. The foils to be used may be paper, synthetic, or hybrid foils where e.g. a sputter deposited metal layer is enclosed between synthetic and/or paper layers, or they may consist or metal or be provided with a metal layer. They may he used for so-called innerliners, for cigarette mouthpieces, or for packaging boxes or the like. Hereinafter, for the sake of simplicity, the term "foils" will be used for all these different foil types.

For embossing logos of any kind on foils according to the pinup-pinup process, i.e. by means of teeth that project from the cylinder circumference of the embossing roller and projecting teeth, rings, or ridges on the counter-roller also, there are generally two methods. In the usual method, the logos are produced by removing or modifying the involved teeth on the embossing roller while the remaining teeth serve for satinizing. Examples for these methods ae found in the US 2005/280182 A1, U.S. Pat. No. 6,715,411 B1, both to the same applicant and in the WO 2009/113115 A1.

In a second production process, teeth are only provided on the embossing roller in those locations where the logos are to be produced. In the remaining areas, teeth may be provided which serve for driving the rollers and for their stability.

Both methods have in common that particularly in the case of larger empty areas, the foil will not be uniformly embossed over its entire width as the pressure applied to the foil is not the same whether teeth are interlocking or teeth of one roller face empty areas on the other roller.

On this background, it is the object of the present invention to provide a device for embossing foils that always allows a uniform embossing over the entire width of the foil independently of the embossing method and of the presence of teeth in the logo area or of the arrangement of the rings or ridges on the rollers, and independently of the nature and the composition of the foil. This device is defined in independent claim 1.

Further objects and advantages such as e.g. the fact that the wrapping foils may be provided with embossed reinforced portions even in critical locations, are indicated in the dependent claims.

The invention will be explained in more detail hereinafter with reference to drawings of exemplary embodiments.

BRIEF DESCRIPTION OF THE DRAWINGS

In FIGS. 1 to 16, the second number indicates the associated Figure of an exemplary embodiment.

FIG. 1 shows the essential parts of a first device of the invention for positive logo embossing with two rollers schematically and in a perspective view.

FIG. 2 shows second device of the invention for positive logo embossing with three rollers.

FIG. 3 shows an embodiment variant of the device of FIG. 2.

FIG. 4 shows another embodiment or the invention With three rollers schematically and in a perspective view.

FIG. 5 shows a variant of the example of FIG. 4.

FIG. 6 shows another exemplary embodiment of the device of the invention.

FIG. 7 shows a variant of the example of FIG. 6.

FIG. 8 shows another exemplary embodiment of the device of FIG. 4.

FIG. 9 shows a variant of the example. FIG. 8.

FIG. 10 shows another exemplary embodiment of the device of FIG. 4.

FIG. 11 shows a variant of the example of FIG. 10.

FIG. 12 shows another variant 10.

FIG. 12A shows a synchronizing gear of the arrangement of FIG. 12 in a sectional view.

FIG. 13 shows an embodiment variant of FIG. 1.

FIG. 14 shows an embodiment variant of FIG. 2.

FIG. 15 shows a device of the invention for negative logo embossing with three rollers.

Figure 15:
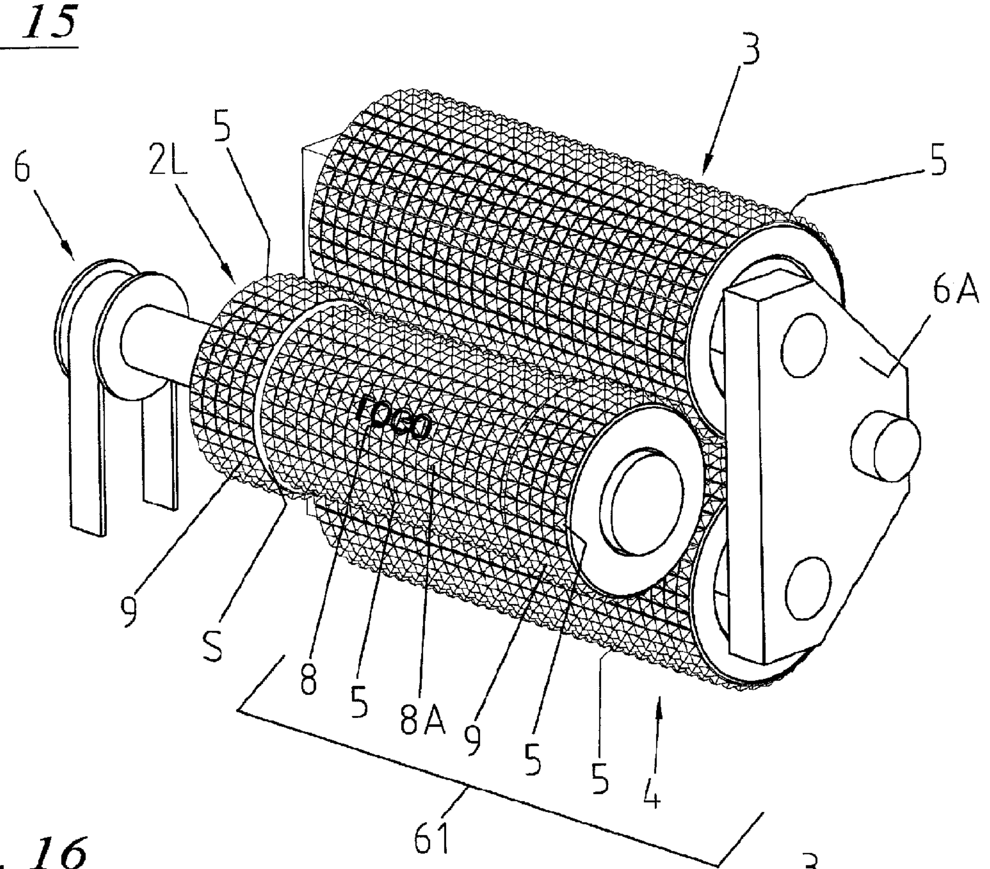

F1G. 16 shows an embodiment variant of FIG. 15.

Figure 1:
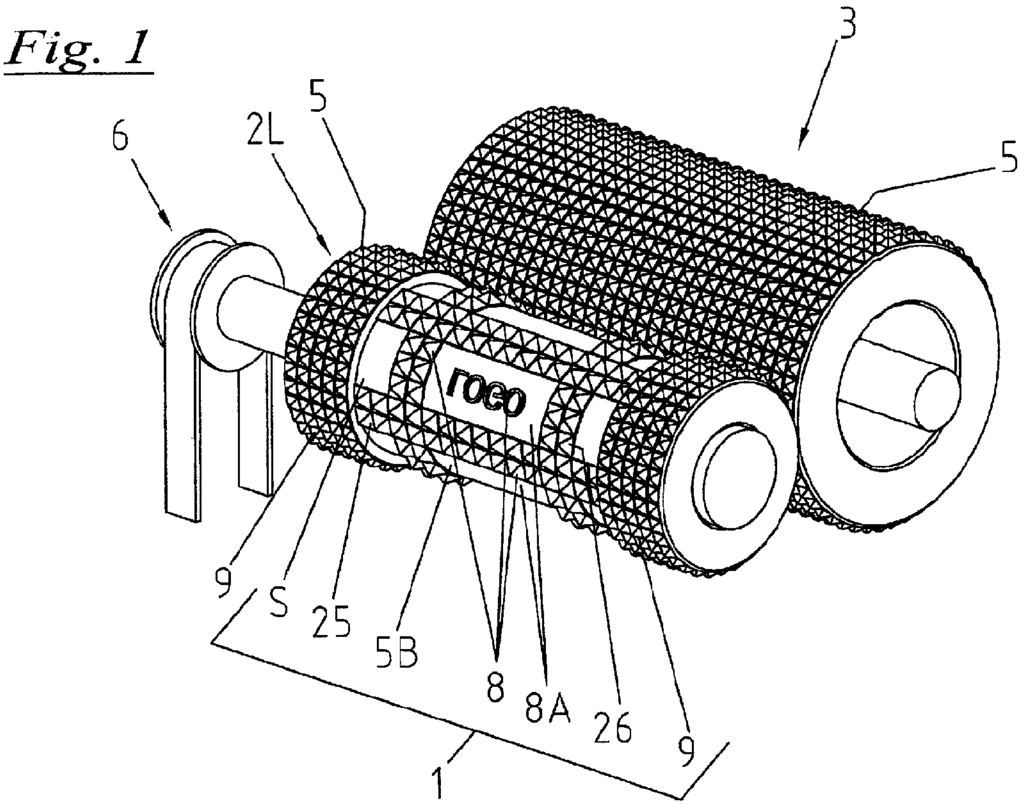
Figure 17:
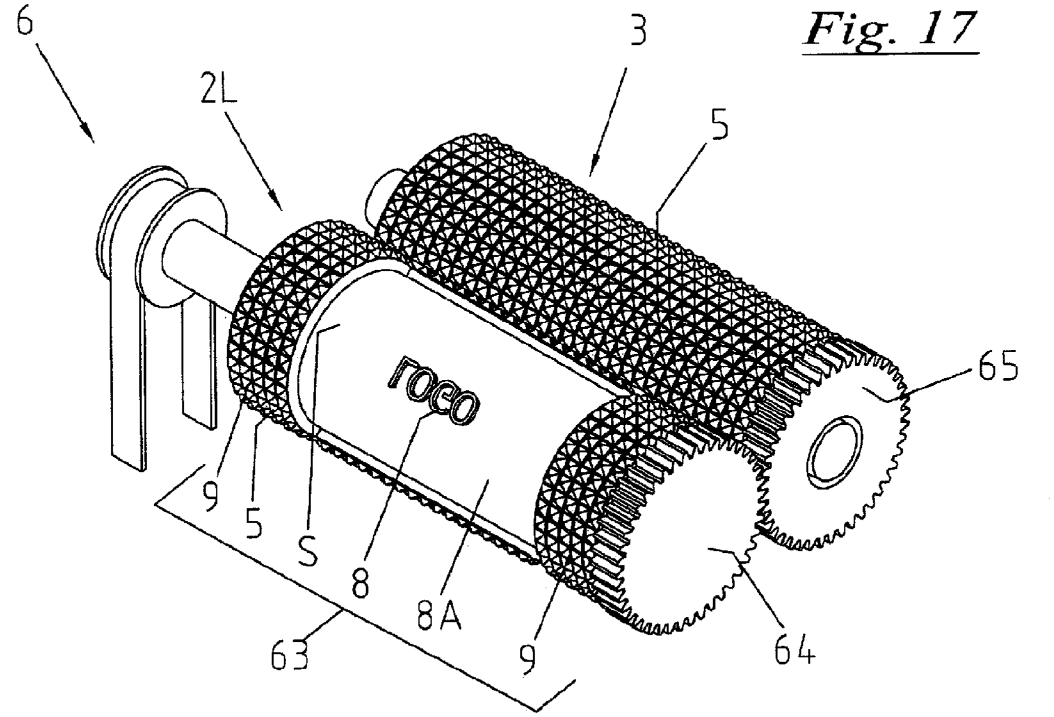

FIG. 17 shows an embodiment variant of FIG. 1 with a synchronizing gear.

Figure 17A:
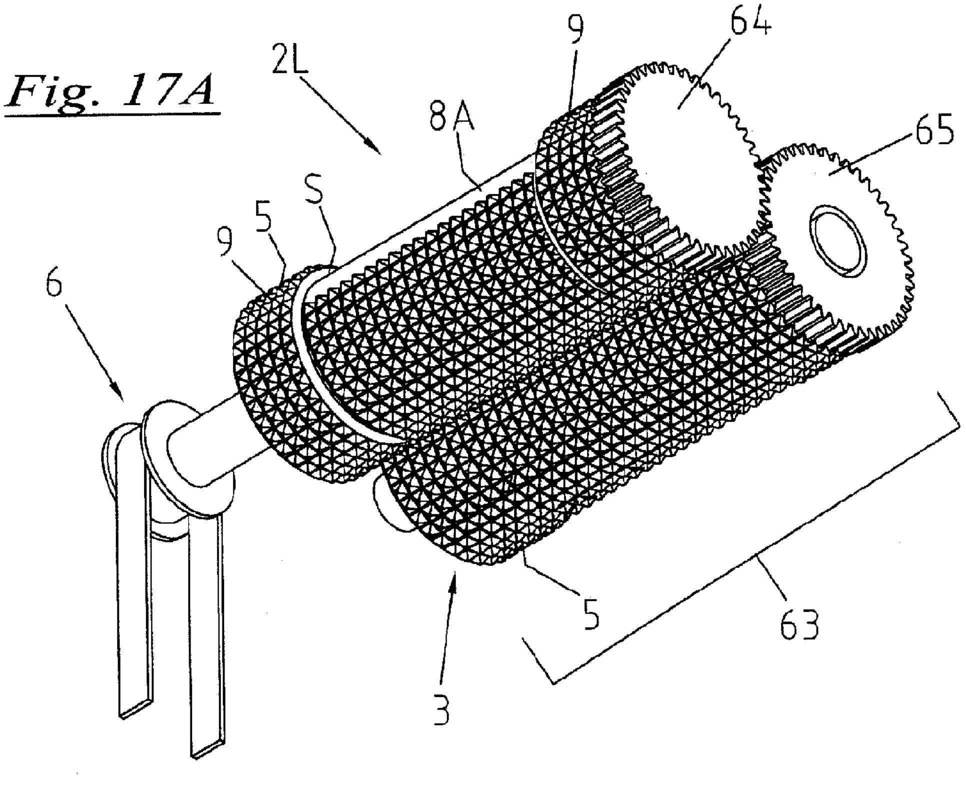

FIG. 17A shows the device of FIG. 17 seen from below.

Figure 18:
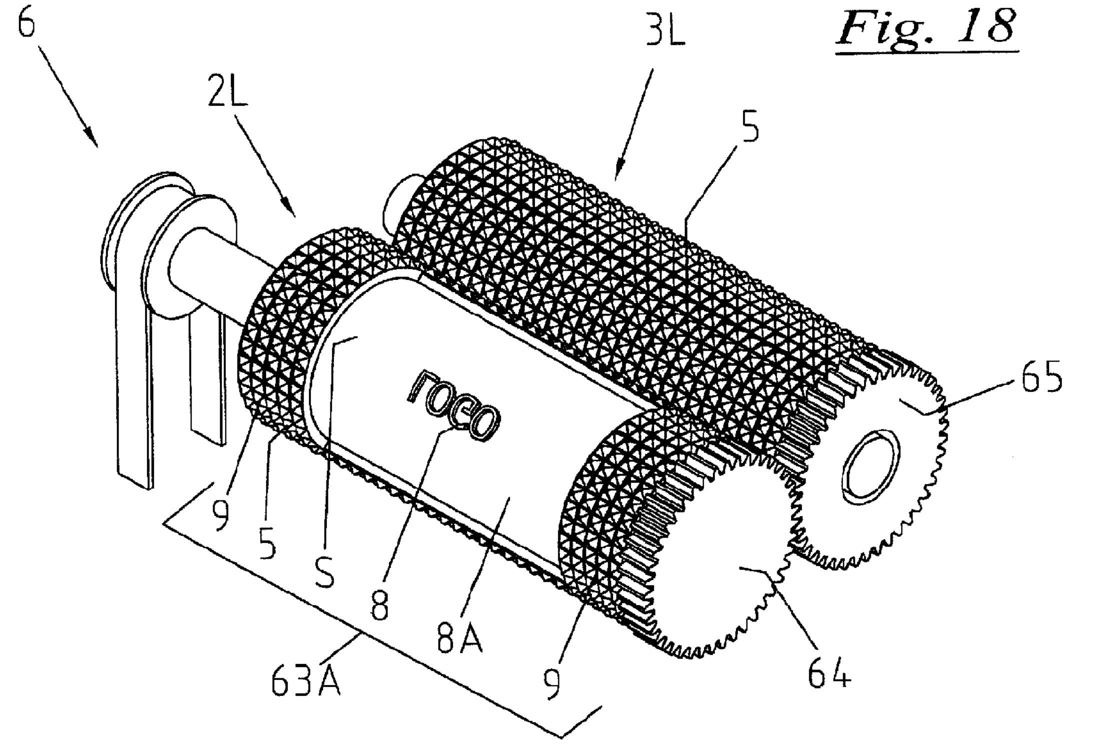

FIG. 18 shows an embodiment variant of FIG. 17 with a synchronizing gear and logos on both rollers.

Figure 18A:
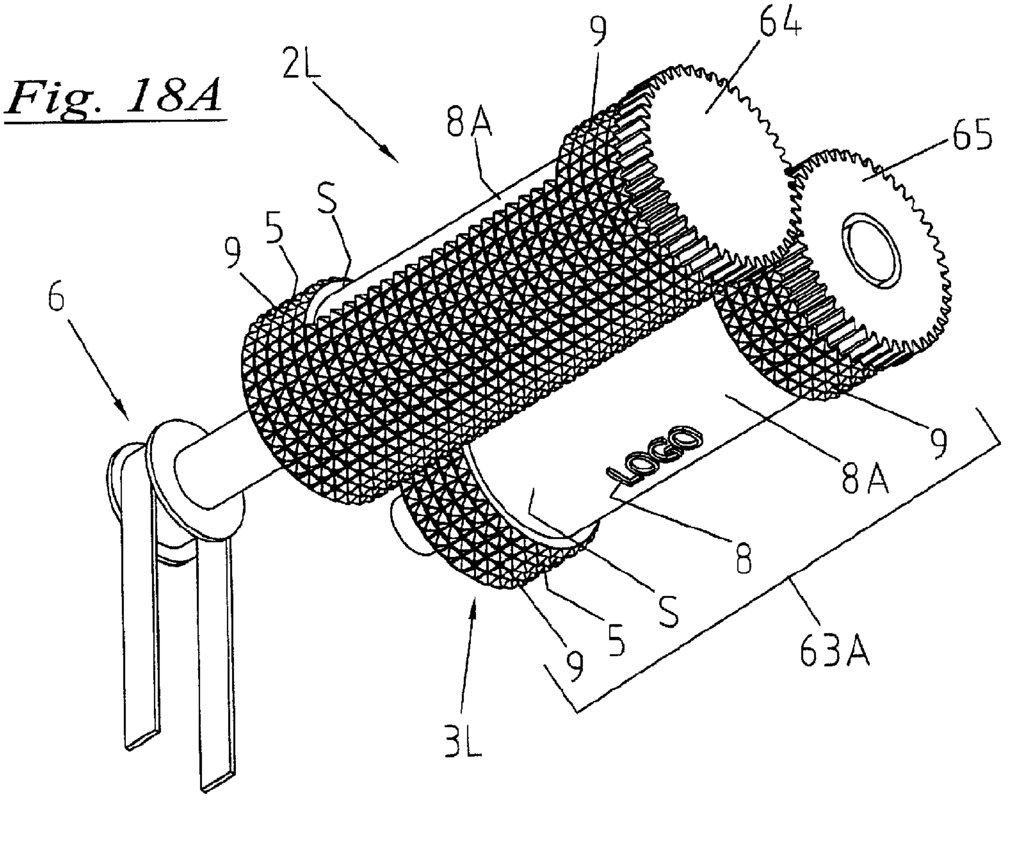

FIG. 18A shows the device of FIG. 17 seen from below.

FIGS. 19A-19E to 25A-25D show possible embodiments of embossing rollers where:

FIGS. 19A-19E show configurations of the embossing rollers of FIGS. 1,4,5,8,10,11, 12.

FIGS. 20A-20E show configurations of the embossing rollers or FIGS. 2, 3, 6,9.

Figure 13:
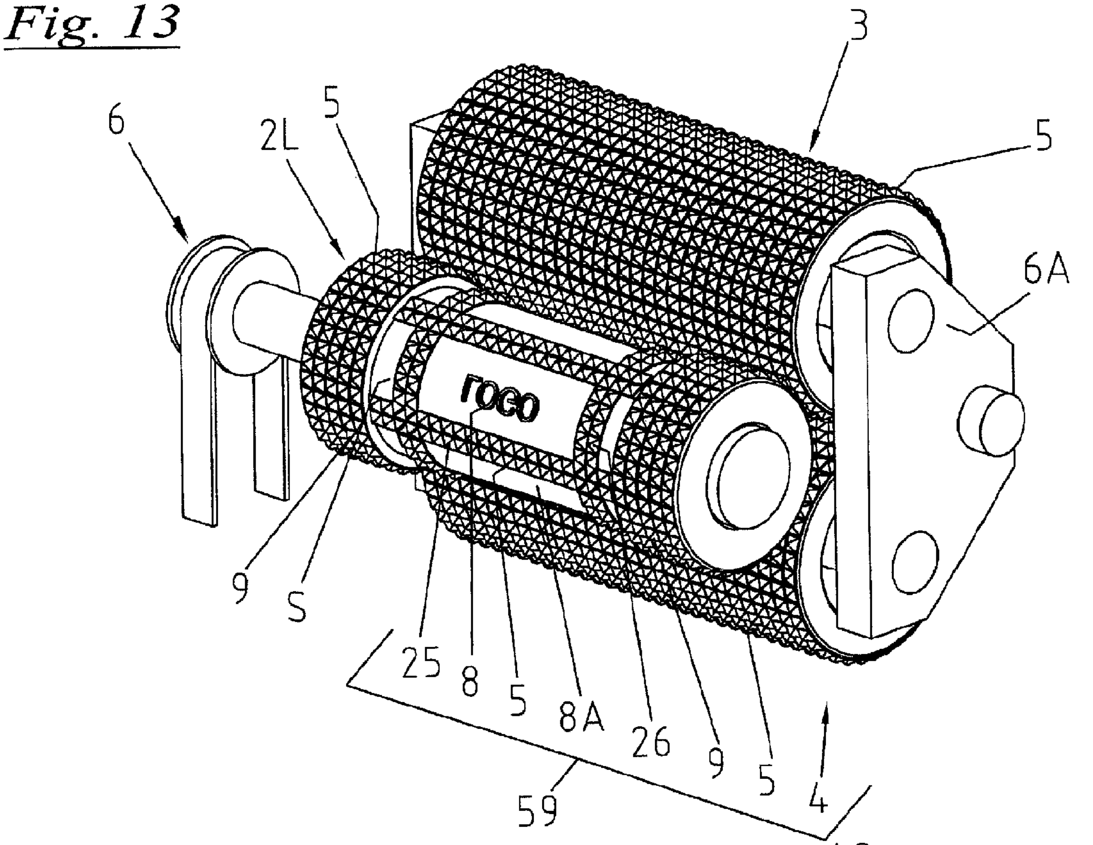

FIGS. 21A-21E configurations of the embossing roller of FIG. 13.

Figure 14:
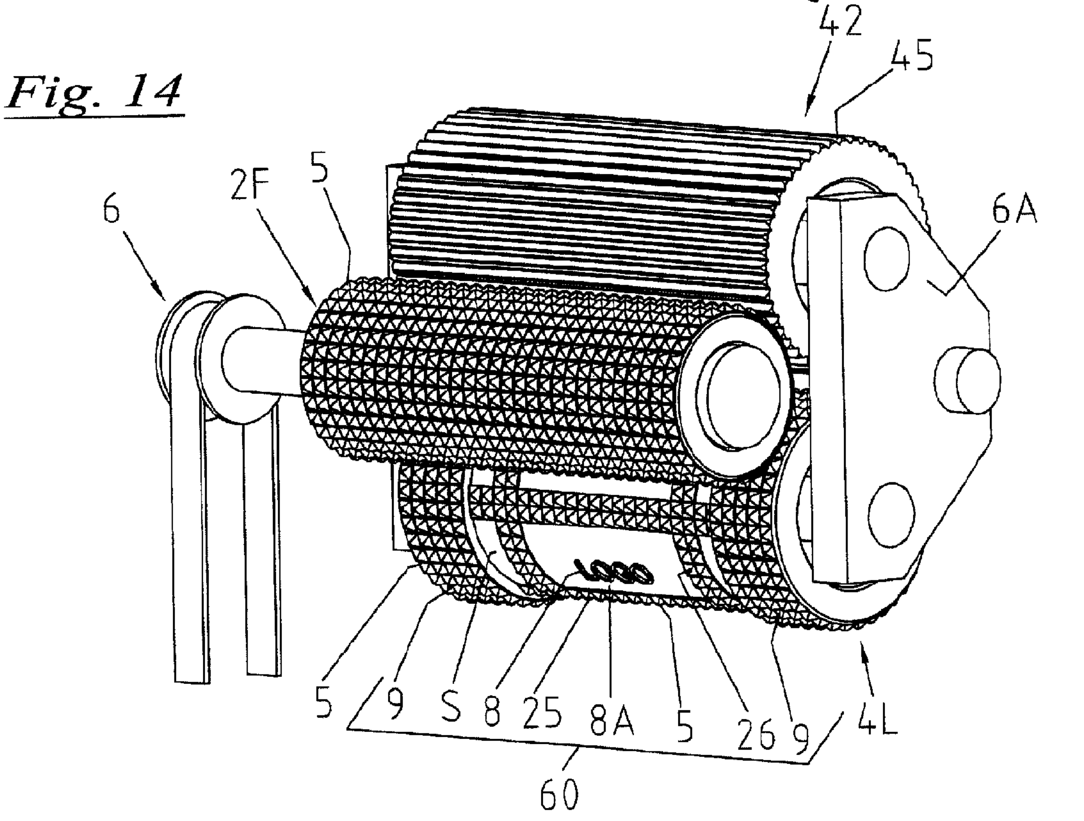

FIGS. 22A-22E, show configurations of the embossing roller of FIG. 14.

FIGS. 23A-23E show configurations of the embossing roller of FIG. 15.

Figure 16:
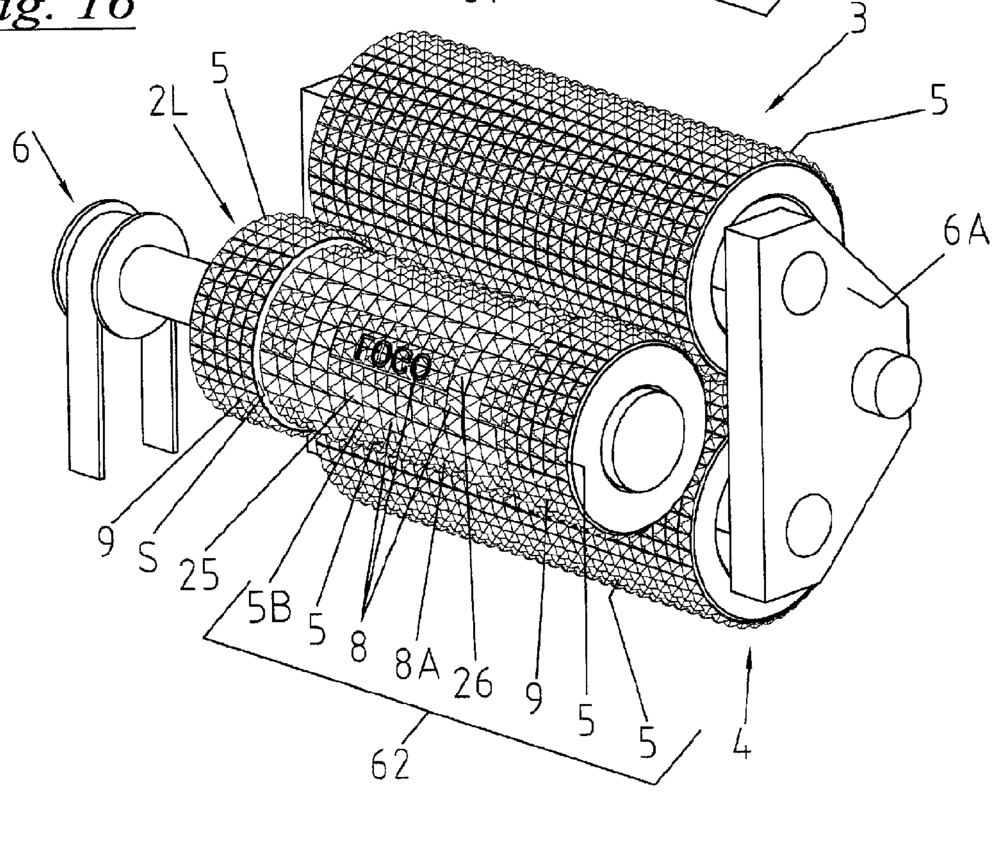

FIGS. 24A-24E show configurations of the embossing roller of FIG. 16.

FIGS. 25A-25D show configurations of an embossing roller.

Figures 19, 19A, 19B, 19C, 19D, 19E:
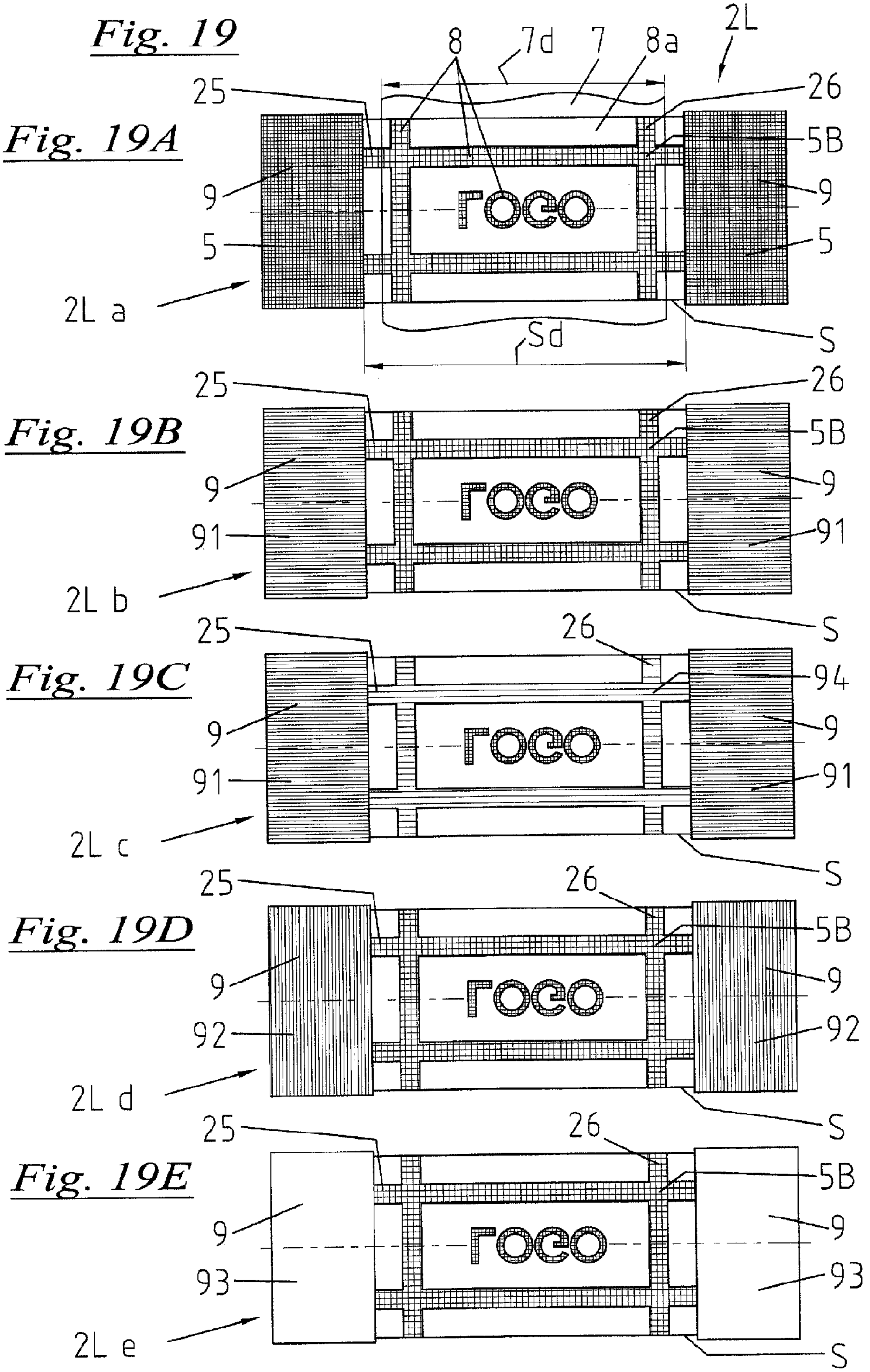
Figure 20:
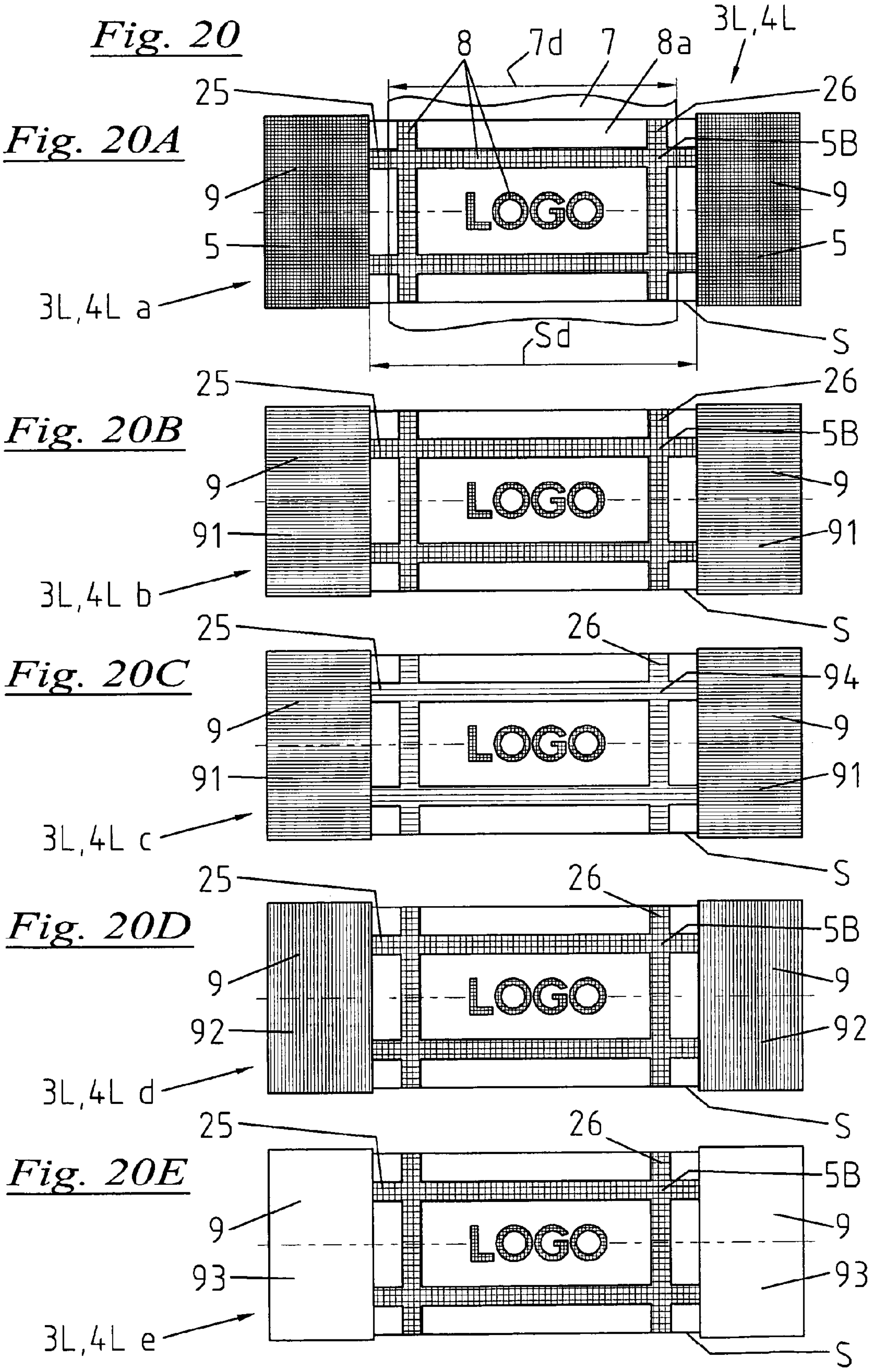
Figure 26:
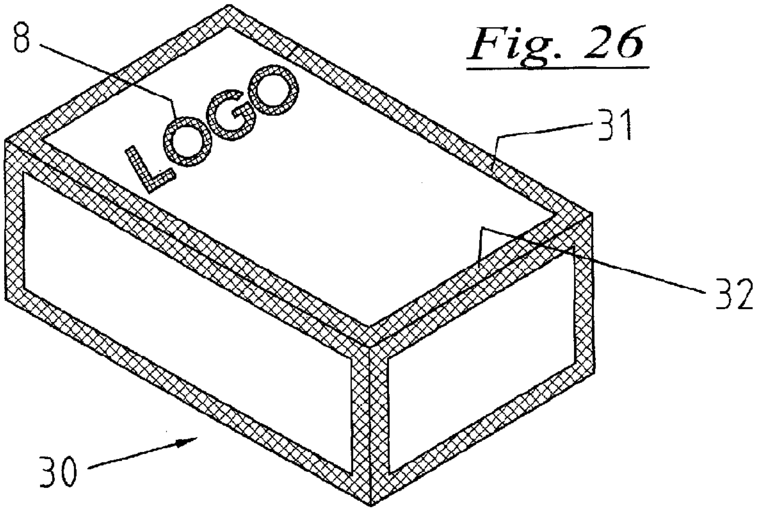

FIG. 26 shows a wrapped box provided with a logo and reinforced edges, the wrapper having been embossed by roller assemblies according to FIGS. 19 and 20.

Figures 21, 21A, 21B, 21C, 21D, 21E:
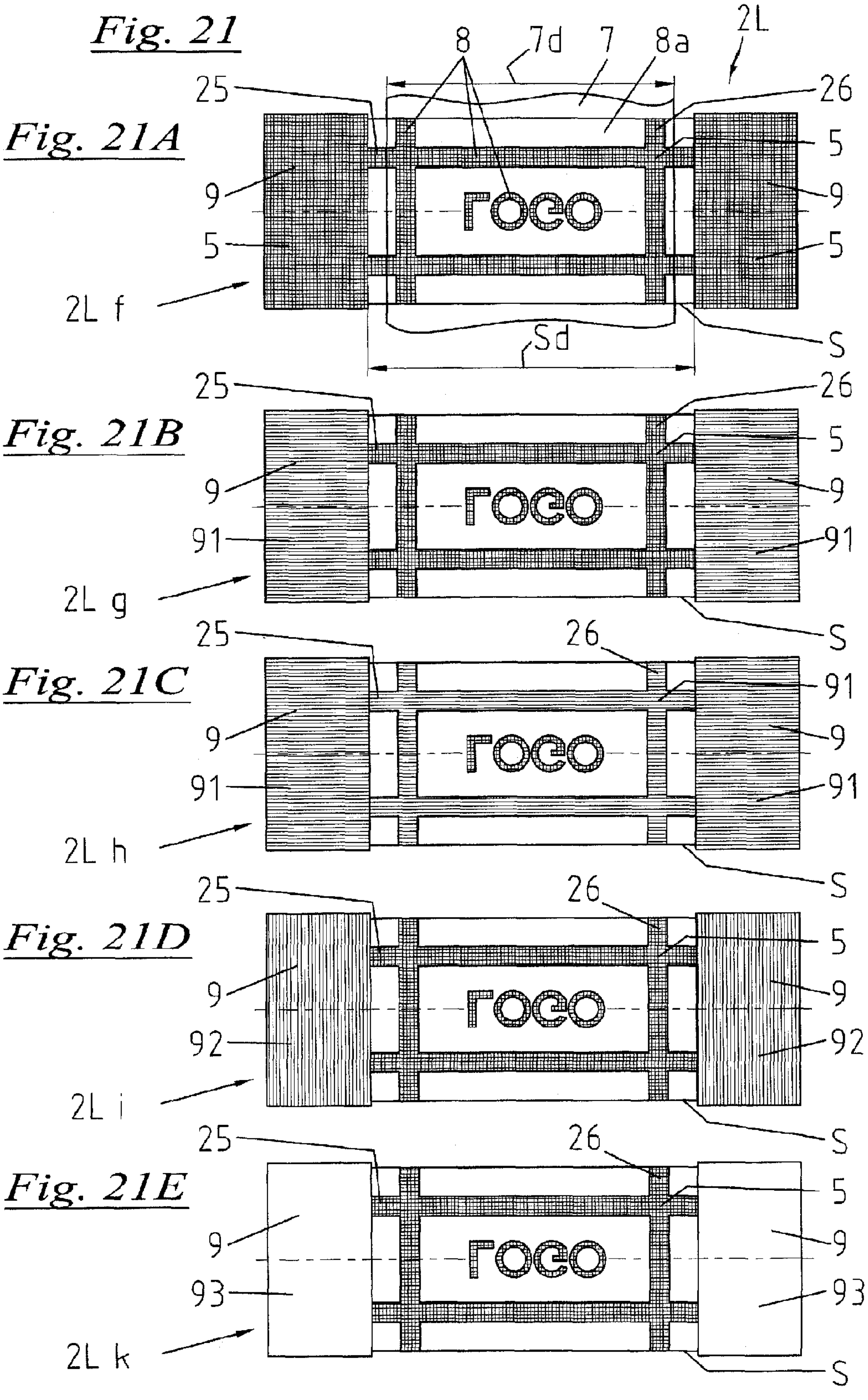
Figures 22, 22A, 22B, 22C, 22D, 22E:
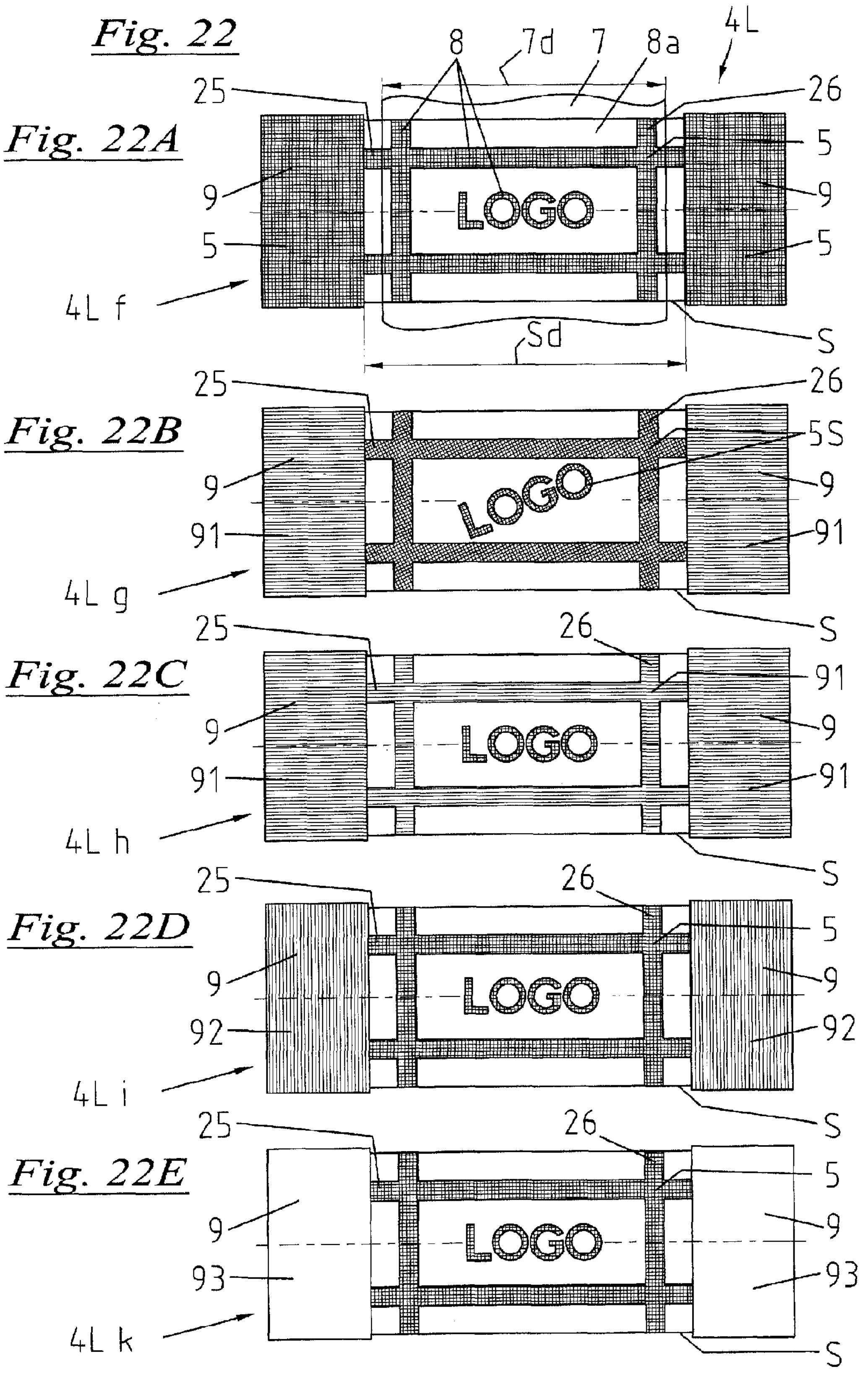
Figure 27:
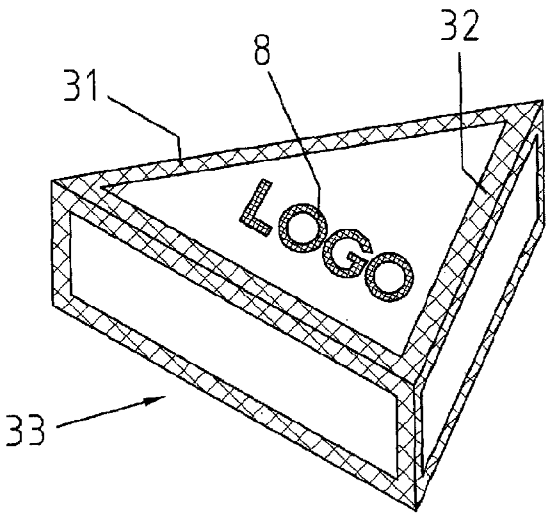

FIG. 27 shows a triangular box provided with a logo and reinforced edges, the wrapper having been embossed by roller assemblies according to FIGS. 21 and 22.

Figure 28:
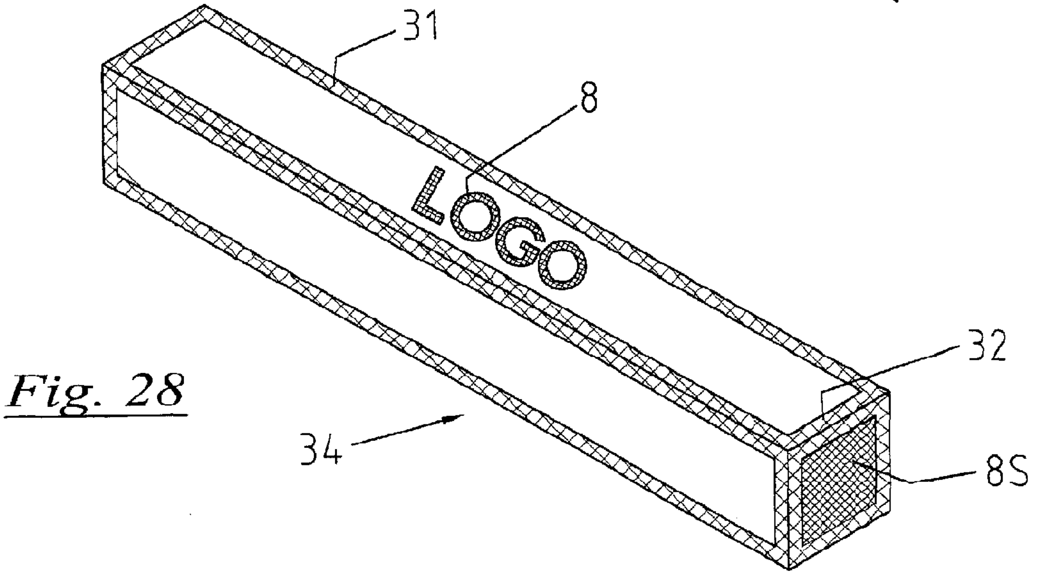

FIG. 28 shows another wrapped box provided with a logo and reinforced edges, the wrapper having been embossed by roller assemblies according to FIGS. 21 and 22.

Figure 23:
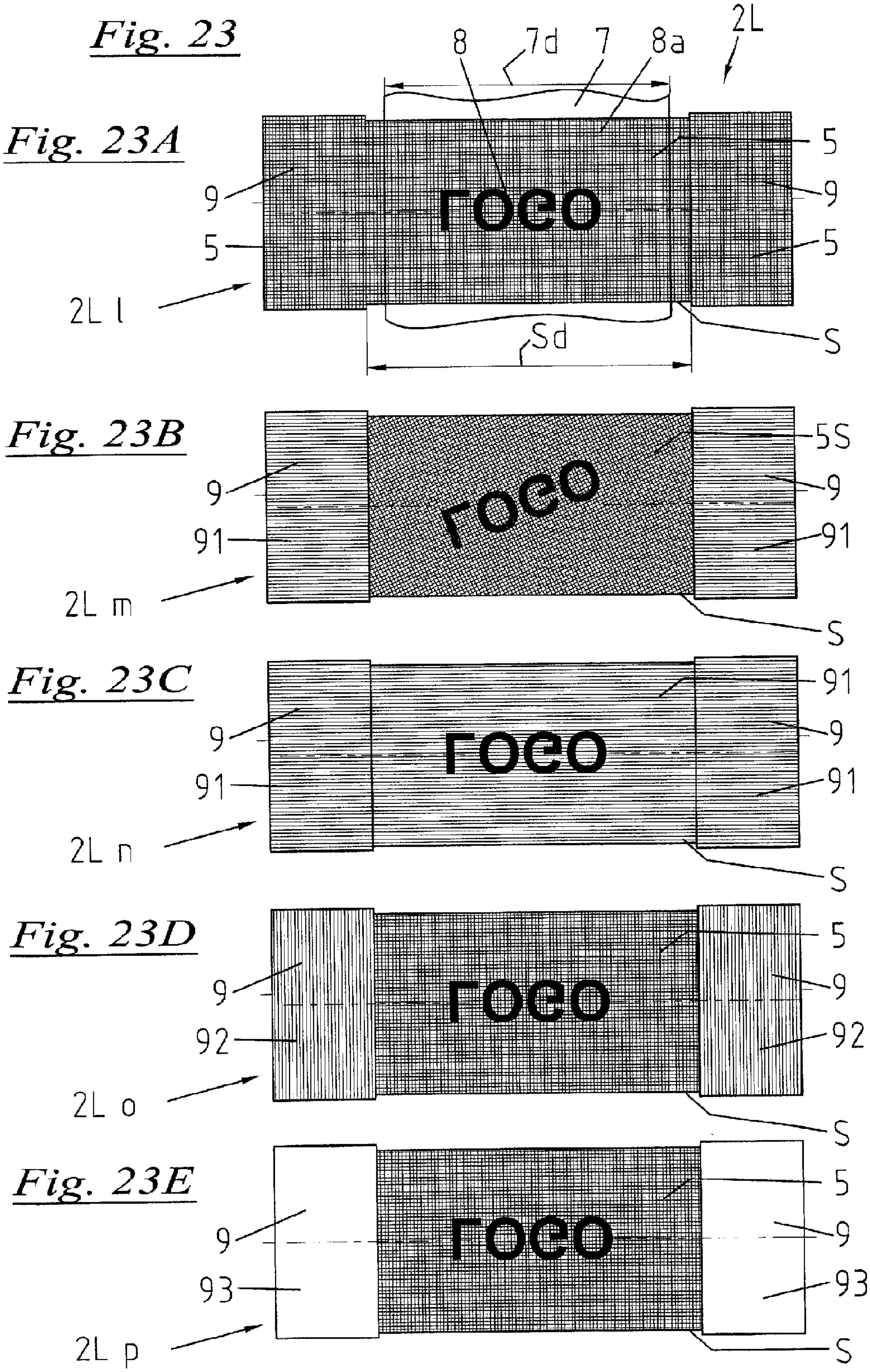
Figure 29:
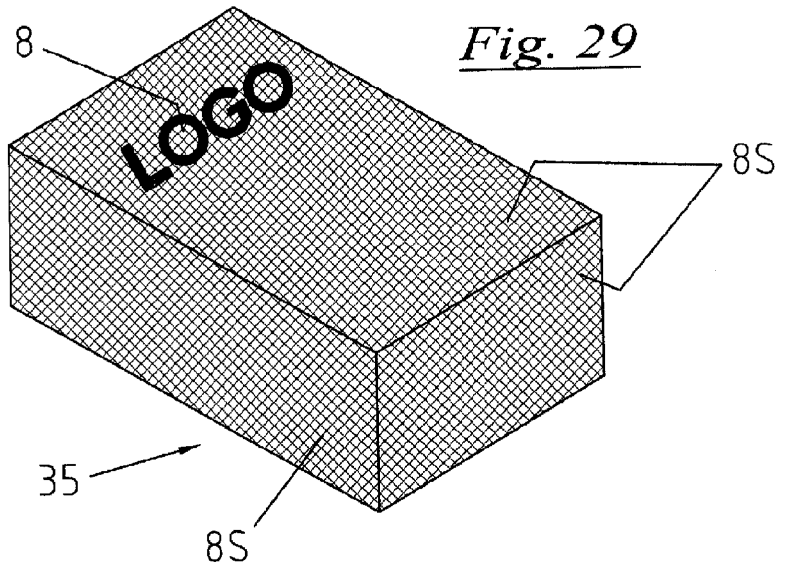

FIG. 29 shows an embodiment variant of FIG. 26, the wrapper having been embossed by roller assemblies according to FIG. 23.

Figures 24, 24A, 24B, 24C, 24D, 24E:
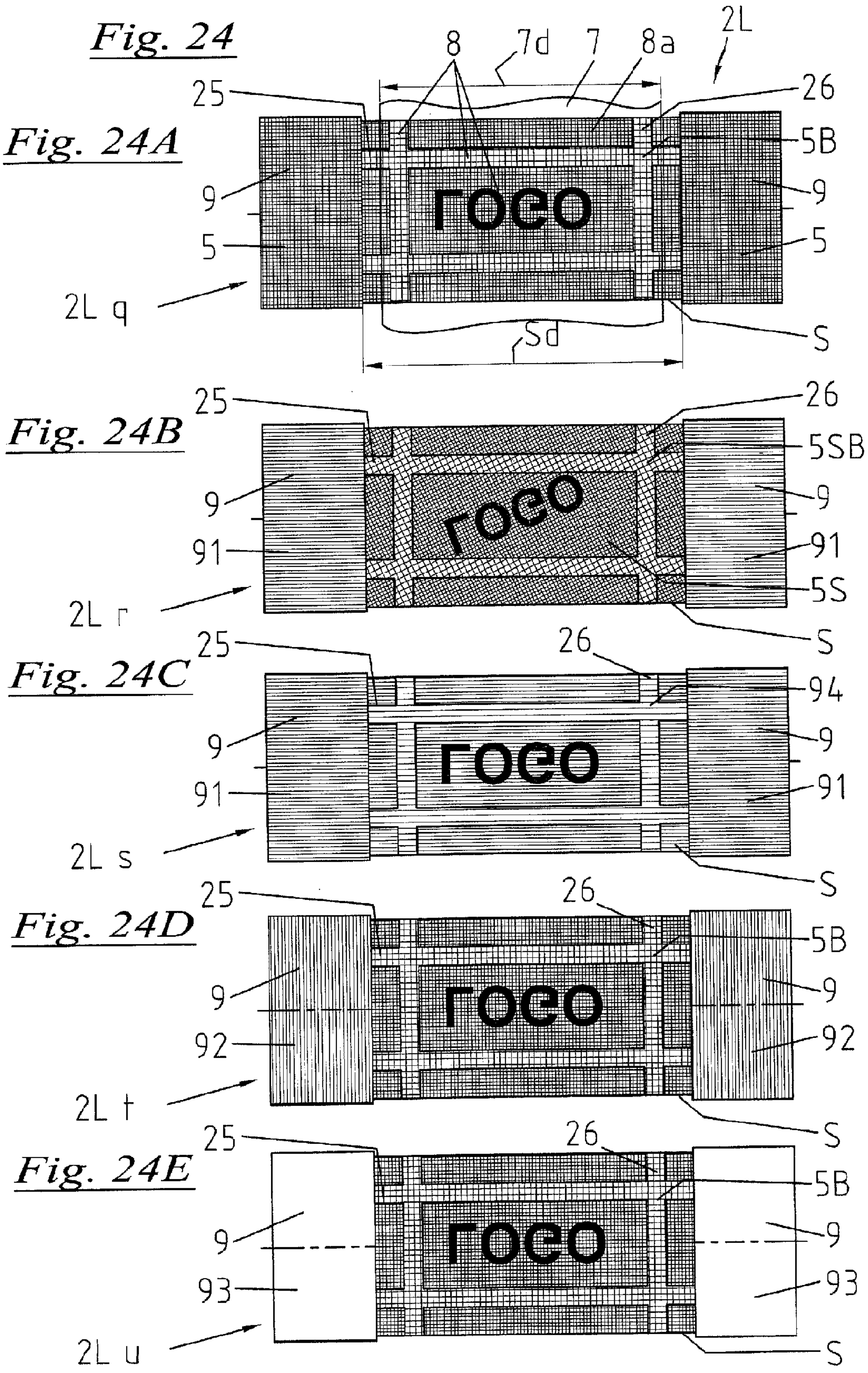
Figure 30:
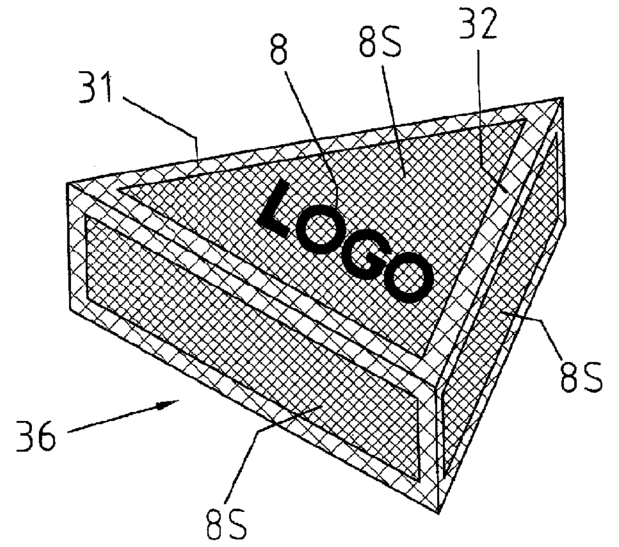

FIG. 30 shows an embodiment variant of FIG. 27, the wrapper having been embossed by roller assemblies according to FIG. 24.

Figure 31:
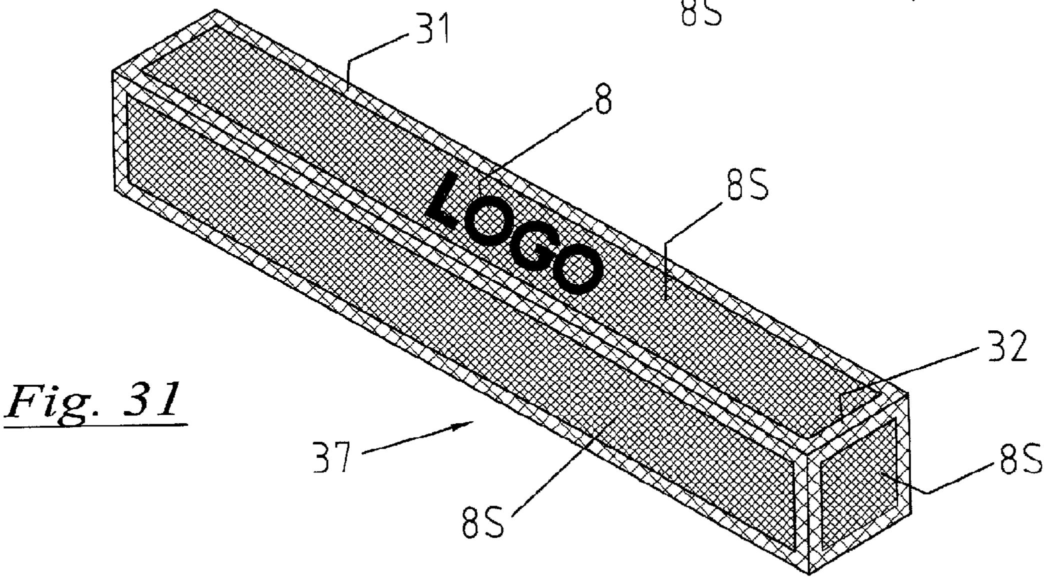

FIG. 31 shows an embodiment variant of FIG. 28, the wrapper having been embossed by roller assemblies according to FIG. 24.

Embossing so-called innerliners for packaging a number of cigarettes, e.g. 20 pieces, by means of an embossing roller arrangement in a so-called pinup-pinup configuration is known from a large number of patents and patent applications to the applicant of the present invention, e.g. from U.S. Pat. No. 5,007,271, U.S. Pat. No. 6,176,819, or U.S. Pat. No. 7,036,347. In this case, by definition, the teeth, rings, or ridges project from the base cylinder as defined by the valleys between the teeth, rings, or ridges. Thus, on account of depression S described below, there are two base cylinders per embossing roller. The embossing units described in the cited references have in common that they comprise at least one roller pair of which the first roller is driven by a drive, e.g. via a belt from the installation or by a separate motor, and this driven roller drives the counter-roller(s) by its teeth via the foil passing therebetween.

In these devices, the metallized surface of the foil is satinized, i.e. provided with a very large number of small indentations which produce a diffuse reflection of the impinging light. By omitting or modifying teeth, a logo is created either as part of the non-embossed, shiny foil surface or as embossed foil surface portions producing various optical effects depending on the light incidence.

Furthermore, WO-02/076716A1 or EP-2 027 994A2 to the applicant of the present invention disclose an embossing unit that is composed of three rollers and where in the case that all three rollers are provided with teeth, the driven roller drives the two counter-rollers, or the rollers are linked to each other by a synchronizing means.

Basically, there are essentially two methods for embossing logos, the term logo encompassing all kinds of signs, words, decorative or reinforcing elements: On one hand, the embossing of logos in a surrounding area that is defined as being satinized and where due to the removal or modification of teeth either the original foil surface appears or a modified surface is produced in the corresponding locations whose aspect changes depending on the lighting conditions. This can be referred to as negative logo embossing.

On the other hand, the logo may be embossed by teeth that are arranged in a non-embossed surrounding area, which can be referred to as positive logo embossing.

FIGS. 19A-19E to 22A-22E and 25A-25D show examples of positive embossing, and FIGS. 23A-23E and 24A-24E show examples of negative embossing.

Device 1 according to FIG. 1 is based on a pinup-pinup configuration that has been successfully used for embossing innerliners where the two rollers 2L and 3 are provided with teeth 5 and 5B that project from the surface and where a tooth of one roller engages between four teeth of the other rollers, whereby a self-synchronization is achieved and the embossing accuracy is improved and the drive is simplified. First roller 2L is driven by a schematically illustrated drive 6, the drive alternatively being a motor.

Figure 1A:
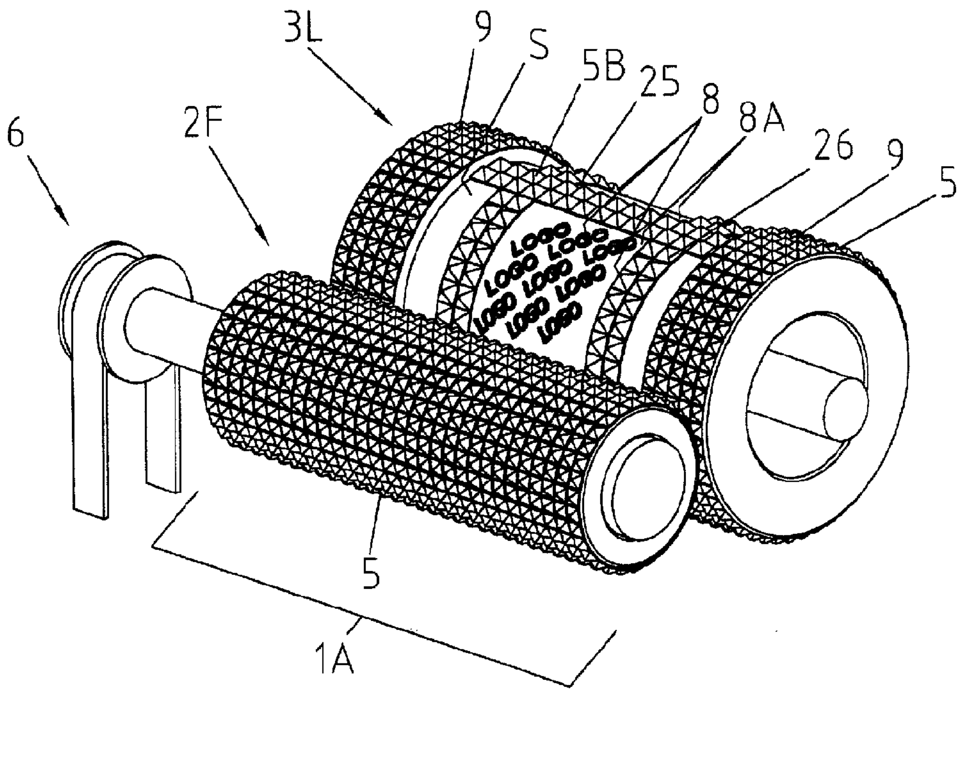
FIG. 1A shows an embodiment variant of the device of FIG. 1.

According to FIG. 1, device 1 uses two rollers for embossing a foil strip 7, see FIG. 41. Roller 2L that is driven by drive 6 is provided with logos 8 that may be lines or rows or a word, in the present example the word LOGO. On both sides outside the logo area 8A, edge zones 9 are located which according to FIGS. 1 and 1A are provided with teeth 5 for a better transmission of the drive force to the counter-rollers. Here the inscription LOGO is formed by teeth 5 whereas reinforcement lines 25 and rows 26 are formed by teeth 5B whose spacing, the so-called pitch, is greater than that of teeth 5. Counter-roller 3 only comprises teeth 5. This embossing assembly is designed for positive embossing. Inventively significant for all embossing rollers and for both embossing types is a depression S, see also FIG. 19, i.e. a portion of reduced diameter ($D_2$) compared to the diameter ($D_1$) of the other, remaining portions of the roller, this depression S extending over logo area 8A on an axial length $S_d$ that is at least the same as the width $\mathbf{7}_d$ of foil 7. In general the length $S_d$ is greater then the width of the foil 7. The additional length is dependent on the embossing technique and of the foil. For a packaging foil, the depth of the depression S may have a value between 0.02 and 0.20 mm.

It is easily understood from FIGS. 1 to 18 and 19 to 25 that due to depression S, the roller pairs, both in the case of one or two counter-roller(s), are always in engagement with one another via the remaining portions of the roller, edge areas 9 and that independently of the arrangement of the logos or of the number of teeth in the logo area, the pressure distribution on the foil is always uniform since pressure variations of the rollers are always absorbed by the edge areas on both sides of the logo area.

Thus, depression S enables a perfectly uniform embossing of the foil over its entire width and thereby a substantially improved appearance and therefore also a substantially more accurate embossing.

In contrast to the embossing rollers of the prior art for embossing innerliners, see also FIGS. 15, 16, 23, 24 of the invention where the logos are produced by completely removing or modifying the teeth in the corresponding locations and the remaining teeth serve for satinizing, in the so-called positive embossing of wrapping foils, the corresponding embossing roller is only provided with teeth in those locations where logos formed of a number of teeth are to be embossed.

In a satinizing process with simultaneous negative logo embossing on innerliners, the metallized surface of the packaging foil is being embossed so that in almost all cases the driven roller is provided with the logos whereas for embossing wrapping foils it may be advantageous to provide the logos on one of the non-driven embossing rollers in order to obtain positive salient logos thereon, see FIG. 1A where the non-driven roller, i.e. embossing roller 3L of device 1A is provided with the logos. In the present case, embossing roller 3L has twice the circumference of driven roller 2F. A comparison of driven embossing roller 2L to non-driven embossing roller 3L shows that the logos on driven embossing roller 2L are mirror-inverted with respect to the logos on non-driven embossing roller 3L.

Hereinafter, all rollers provided with logo and/or reinforcement lines and rows and possibly with individual teeth will be defined as embossing rollers while the remaining rollers, whether directly driven or indirectly via synchronizing means, are defined as counter-rollers. However, this does not exclude that more than one roller of a device may be provided with logos, see FIG. 18. Moreover it is assumed that the foil strip is always passed between the rollers in the same orientation with respect to a particular side thereof.

Figure 2:
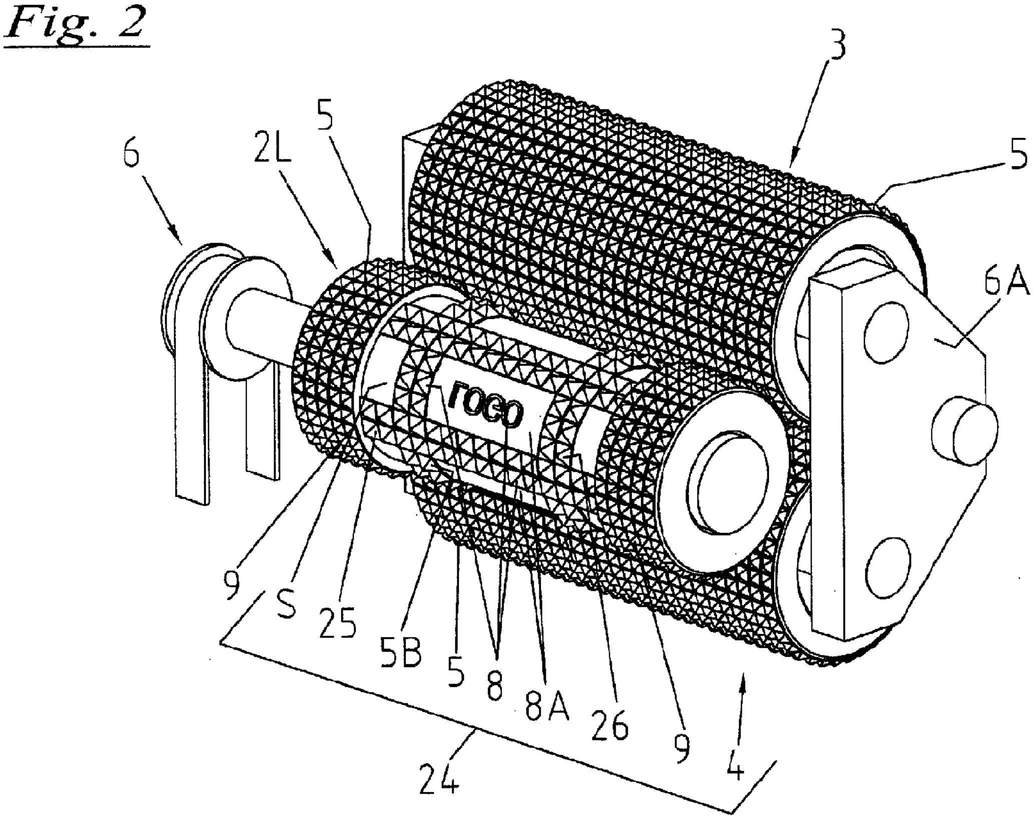
Figure 3:
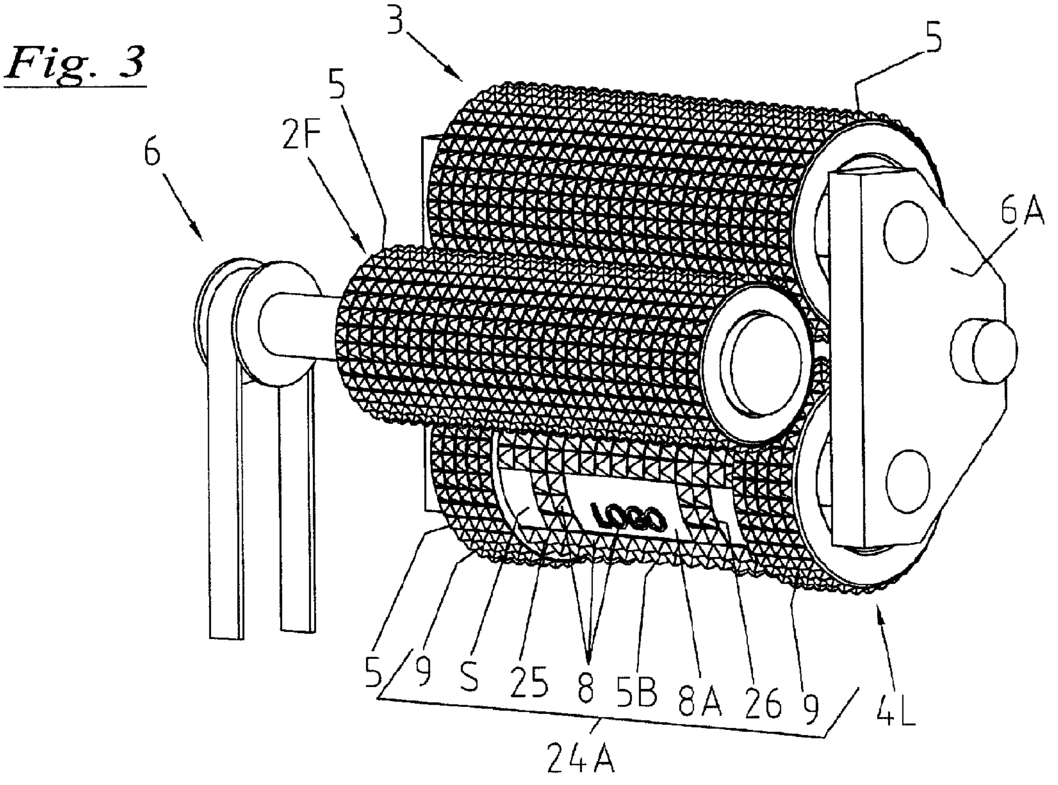

In the exemplary embodiments of FIGS. 1 to 3, teeth 5 of the driven roller and of the counter-roller and of edge areas 9 and possibly also of the logotypes are shown as being pyramidal with a square horizontal projection while their tips may be flattened up to 25%. However, a number of other pyramidal teeth having a variety of other horizontal projections and shapes are possible, e.g. pyramidal teeth having a rectangular horizontal projection which may e.g. have a greater length of their footprint in the direction of the longitudinal axis than in the other direction. The sides of the teeth need not necessarily be orthogonal to the longitudinal axis of the roller and may include any angle between 1° and 89°. The teeth may have a pitch, i.e. a distance=pitch between tips, of 0.05 mm to 0.4 mm for a theoretical height without flattened portions of 0.03 mm to 0.3 mm. Ultimately, the teeth may also have a round cross-section and a conical profile, in which case synchronizing means between the rollers are required, however.

Teeth 5B that are e.g. part of logo lines 25 and logo rows 26 have a greater pitch of e.g. 0.5 to 0.8 mm, i.e. a greater distance between tips than teeth 5. This enables further design possibilities.

Furthermore, individual teeth or groups of teeth may be differently shaped as it is known from the previously cited prior art. As already described in the mentioned prior art more than once, the rollers may be supported so as to be capable of a deviation of a certain amount in all three coordinate directions. For certain applications, however, particularly in the case high travelling speeds of the foils, a rigid arrangement of the roller axes is desirable.

FIGS. 2 to 14 illustrate three-roller devices, such devices with teeth on all three rollers being known in the art from U.S. Pat. No. 6,715,411 to the applicant of the present invention.

Device 24 of FIG. 2 shows a driven roller 2L having logos in the form of logo lines 25 and rows 26 formed of teeth 5B and a logotype 8 formed of teeth 5 that are arranged in logo area 8A. Depression S extends over the entire circumference. Both counter-rollers 3 and 4 have regularly arranged teeth 5.

Device 24A of FIG. 3 shows a driven roller 2F and a non-driven embossing roller 4L having e.g. the same logos as embossing roller 2L in FIG. 2.

In FIGS. 4 to 14, exemplary embodiments from WO-02/07671 to the applicant of the present invention have been adapted according to the invention. Device 40 has three rollers, the same embossing roller 2L as in the preceding examples that cooperates with a first counter-roller 41 and a second counter-roller 42, first roller 2L being driven by a drive 6 while the two counter-rollers are neither driven nor synchronized to the driven roller by synchronizing elements such as gearwheels but only driven via foil strip 7 here.

In contrast to the preceding examples, the three embossing rollers do not have the same structure. In the exemplary embodiment according to FIG. 4, driven embossing roller 2L is the same as before while first counter-roller 41 is provided with grooves 43 running around the entire circumference and arranged in parallel to each other such that teeth 5 of embossing roller 2F engage in the grooves. Similarly, rings 44 formed between grooves 43 are outwardly tapered and flattened so as to engage between the frustopyramidal teeth 5 and 5B.

Analogously, second counter-roller 42 has longitudinal ridges 45 that are also outwardly tapered and flattened like rings 44 in such a manner that longitudinal ridges 45 cooperate with teeth 5 of embossing roller 2. Also, the rings or longitudinal ridges, respectively, may affect the appearance of the embossing patterns produced by the embossing roller provided with teeth. By means of such embossing roller assemblies it is possible to produce different embossing patterns or signs by variations of teeth 5 and 5B or of rings 44 or of longitudinal ridges 46, i.e. by altering the height, the flanks, or the edges of the teeth, rings, or longitudinal ridges, or by applying patterns to their upper surfaces.

Figure 4:
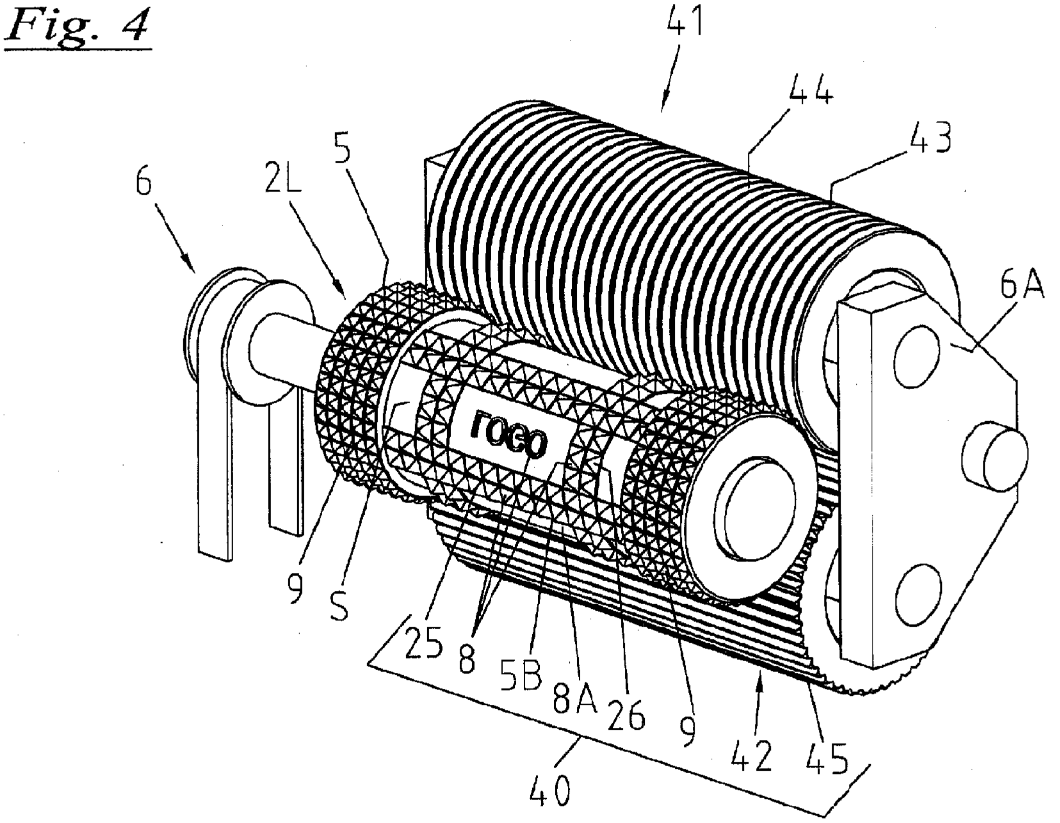
Figure 5:
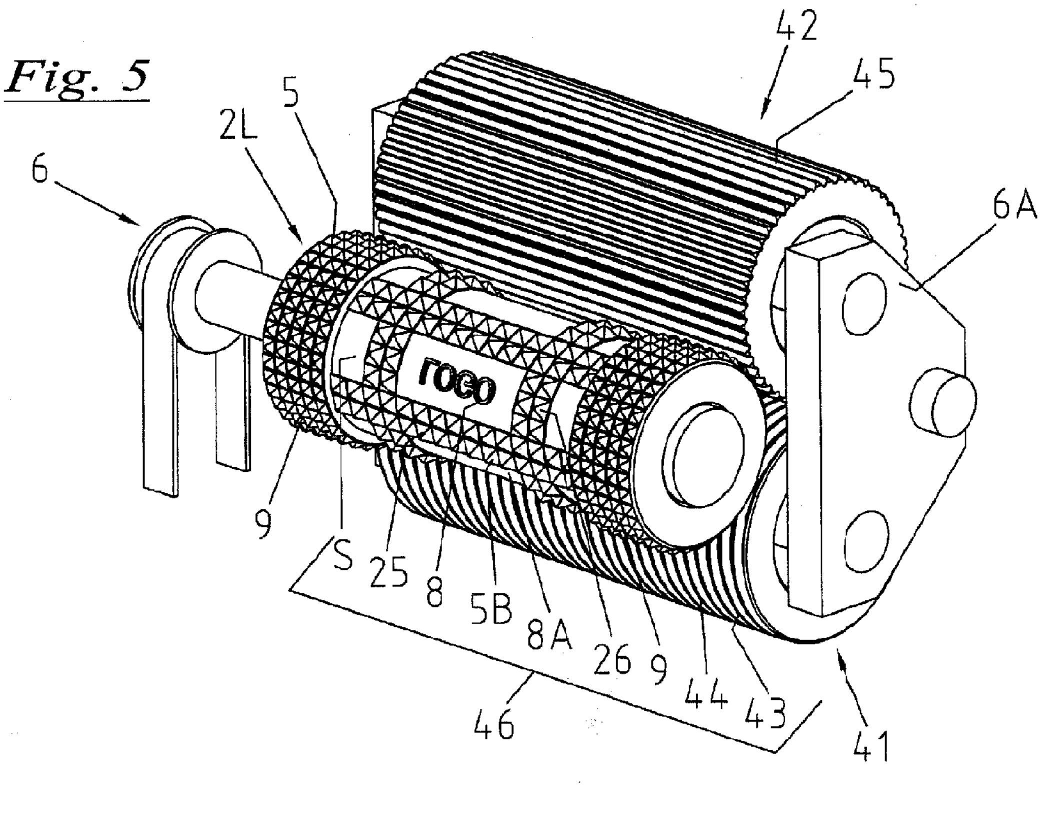

In FIG. 4 or 5 it is symbolically indicated that the two counter-rollers interlock with embossing roller 2L, but this is not necessarily always the case. It is also possible that the first or the second counter-roller, respectively, only interlocks or is only capable of interlocking with the first or the preceding roller, respectively. Furthermore it may be advantageous for certain applications to provide more than three embossing rollers having different surface structures. Furthermore, both the diameter and the length of the individual rollers may differ. Also, in addition to the metal rollers, soft counter-rollers may be used.

FIG. 5 shows a second device 46 comprising the same embossing roller 2L and counter-rollers 41 and 42 provided with the rings and longitudinal ridges, respectively, whereas the order of the counter-rollers is reversed as compared to the order according to FIG. 4 and, seen in the travelling direction of the material 7, the counter-roller provided with the longitudinal ridges enters into engagement first and then the embossing roller provided with the rings.

Figure 6:
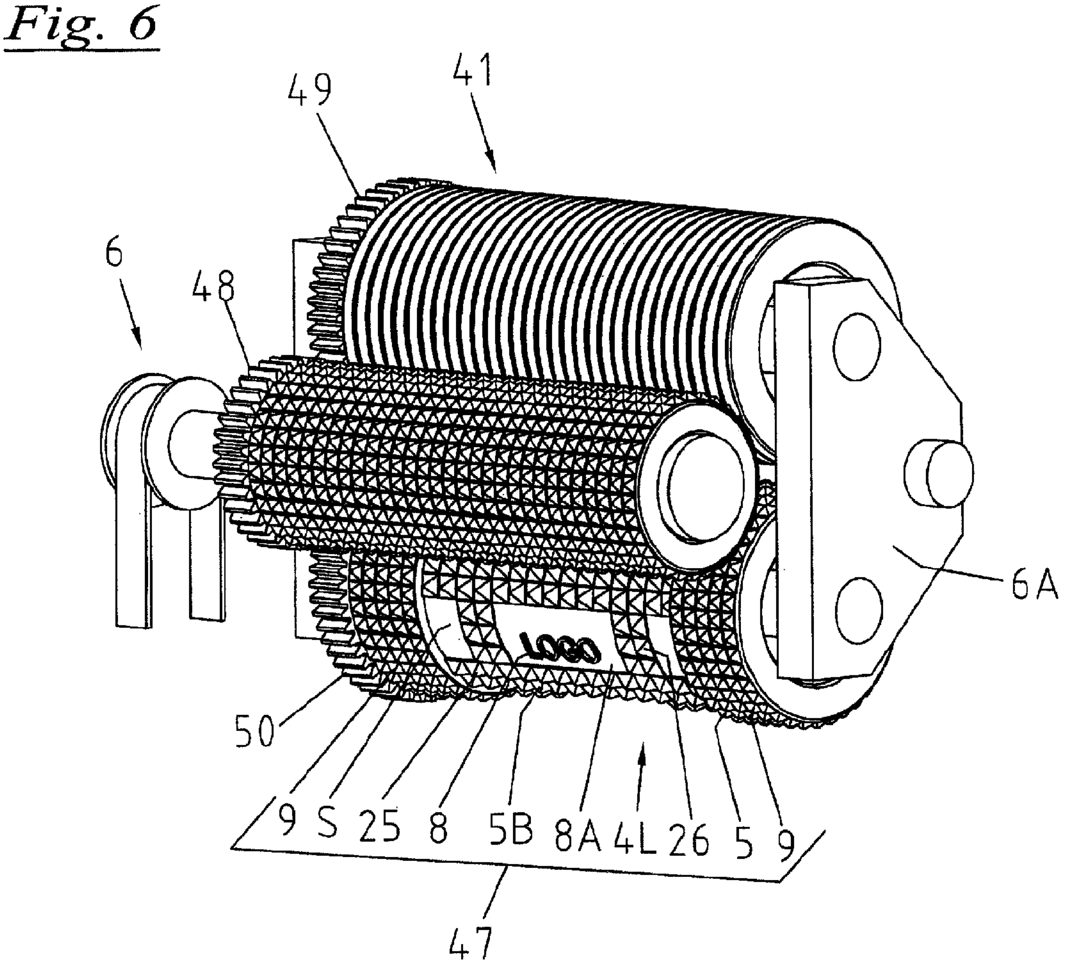
Figure 6A:
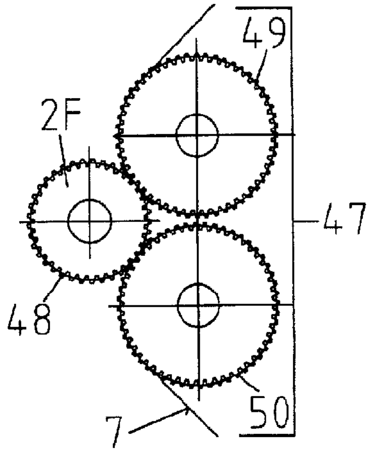
FIG. 6A shows a synchronizing gear of FIG. 6 in a sectional view.

In the exemplary embodiment according to FIG. 6, device 47 comprises a driven roller 2F and, like in FIG. 4, counter-roller 41 provided with rings 44 as the second roller. The following embossing roller 4L is a similar one as according to FIG. 2. In FIGS. 6 and 6A it is illustrated how rollers 2, 41, and 4A are forcedly synchronized by gearwheels 48, 49, 50. A forced synchronization is also advisable particularly if the material is subject to strong warping in the embossing procedure.

Figure 7:
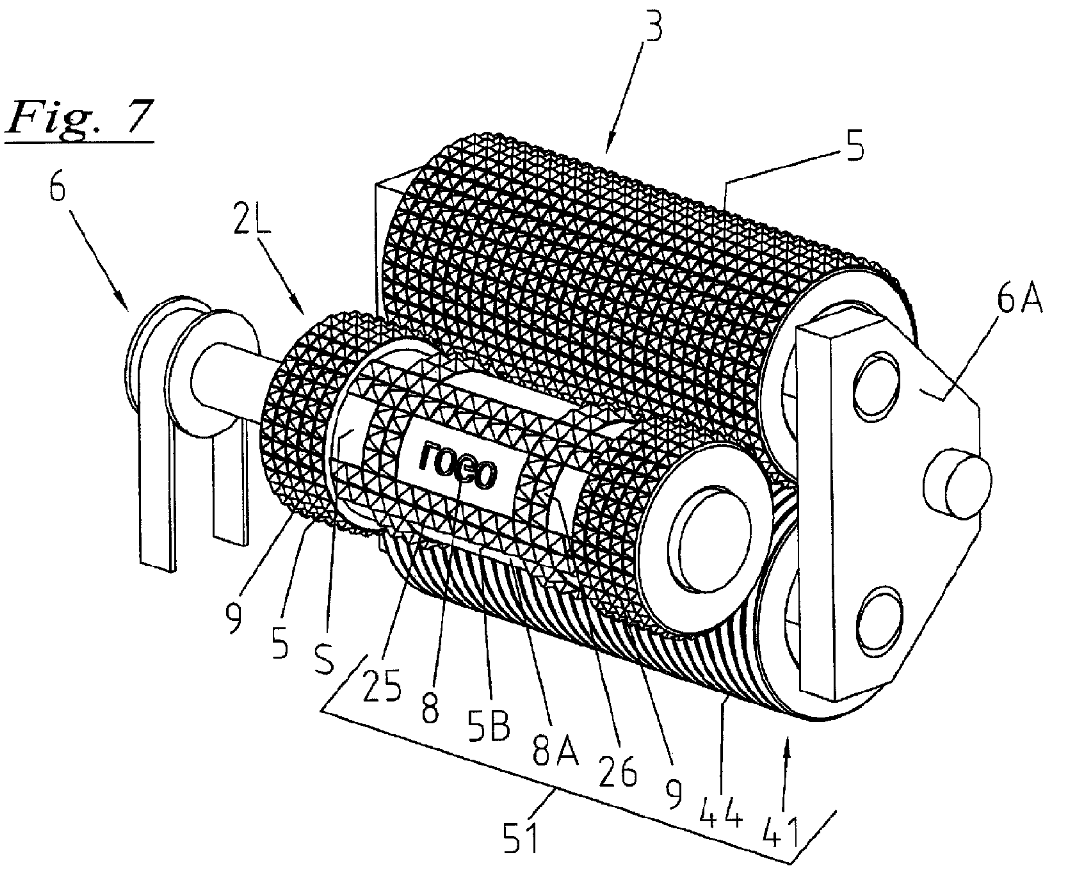
Figure 8:
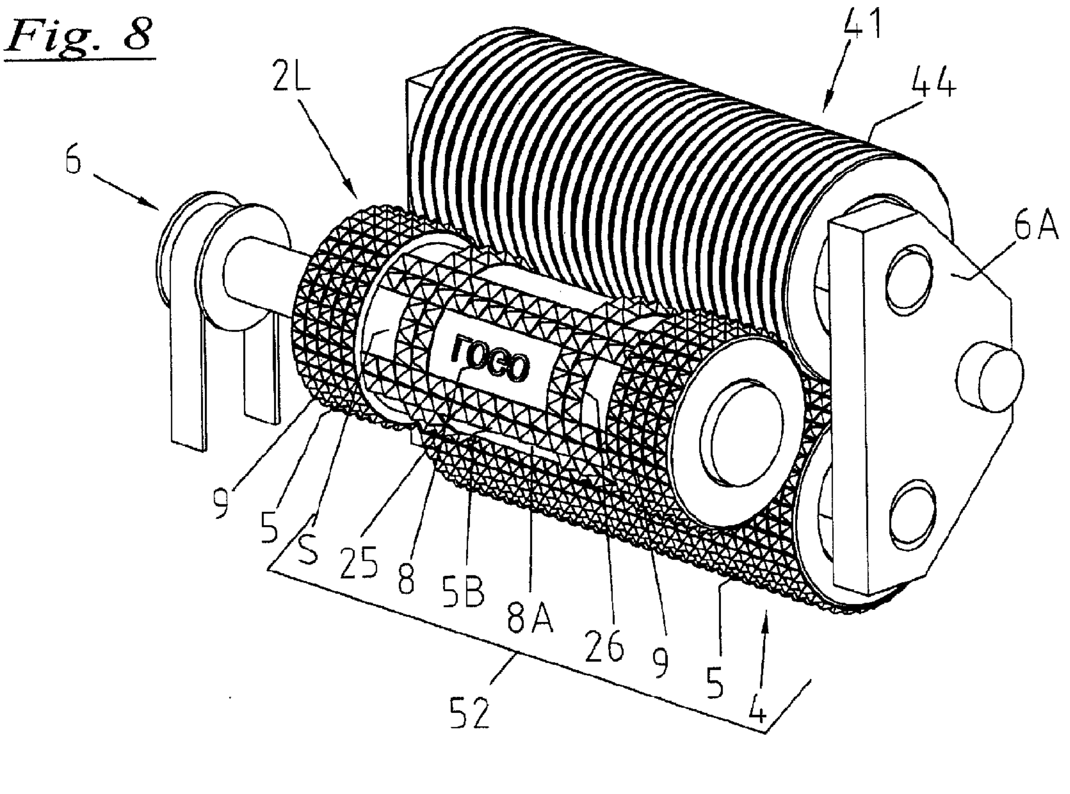

As a variant of FIG. 6, the device 51 according to FIG. 7 is illustrated where embossing roller 2L cooperates with counter-roller 3 and ring roller 41. In device 52 according to FIG. 8, the two counter-rollers are reversed, and the rollers of these two embodiments are not forcedly synchronized.

Figure 9:
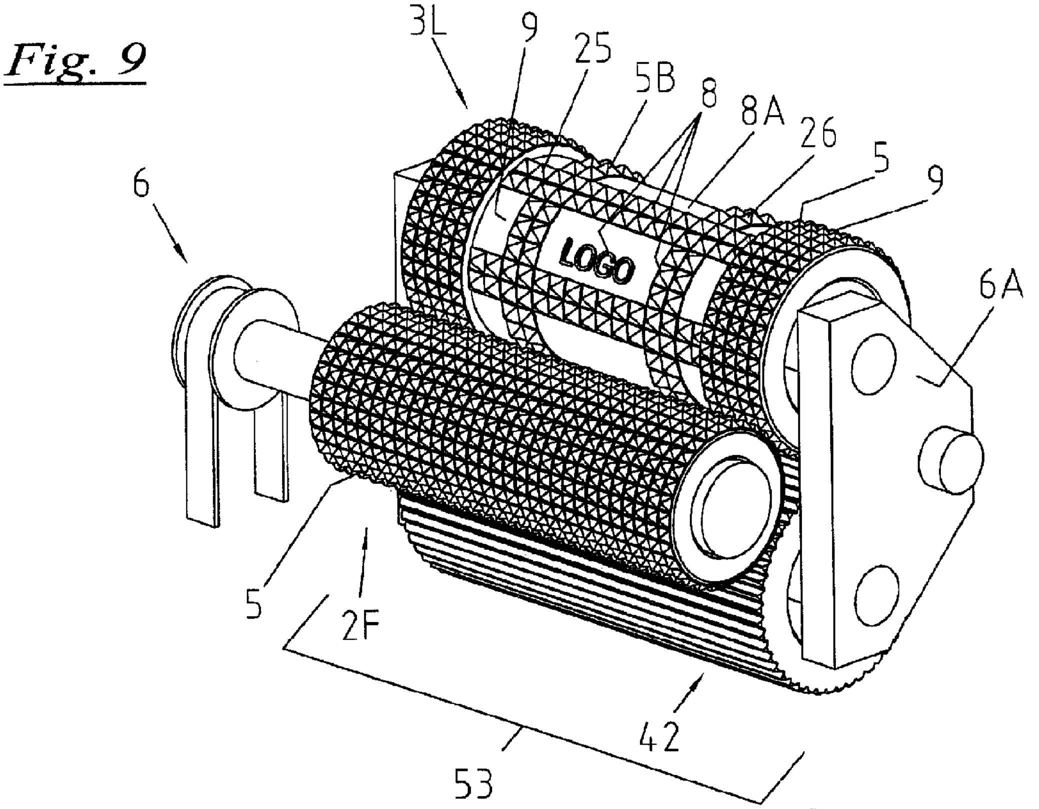

In device 53 according to FIG. 9, a combination of driving roller 2F with embossing roller 3L and longitudinal ridge roller 42 is illustrated which require no forced synchronization.

Figure 10:
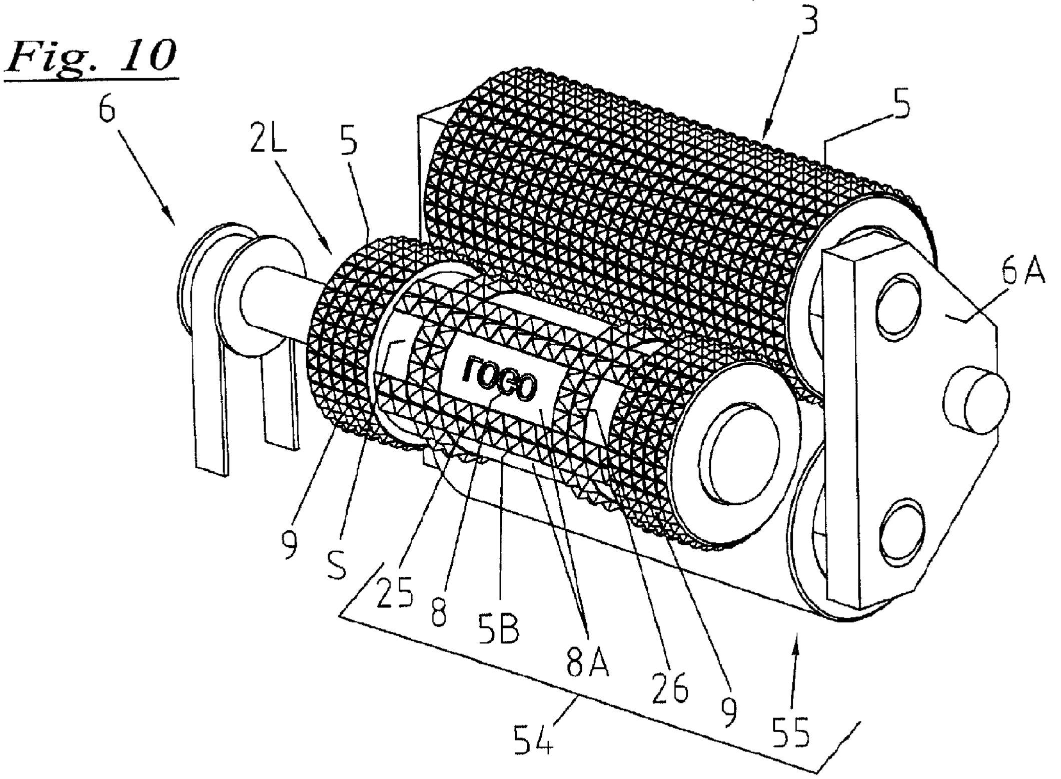

In FIGS. 10 and 11 another variant is depicted where the first roller in device 54 is embossing roller 2L and the second roller is toothed roller 3 according to the preceding examples while the third roller, in contrast to the preceding examples, is a rubber roller 55 having a comparatively smooth surface. In device 56 according to FIG. 11, the order of rollers 3, 4, and 55 is reversed.

FIGS. 12 and 12A illustrate a variant of the embodiment of FIG. 10 where embossing roller 2L and toothed roller 3 in device 58 have the same teeth 5, i.e. a pinup-pinup configuration, and the two counter-rollers 3 and 55 are forcedly synchronized by a gear comprising gearwheels 48, 49, and 57.

Based on these examples, variations are possible: Thus, rubber roller 55 may be used instead of ring roller 41 or longitudinal ridge roller 42. Furthermore, the bearings or the two yokes 6A receiving the two bearings are schematically depicted in the figures. This is also meant to indicate that the roller axles may be supported individually, in groups, or in common. Here also, the embossing rollers need not have the same diameters and the same lengths, but in contrast to the first example, if the synchronization is achieved by gearwheels, unless they are equal, the diameters of the rollers must have an integral ratio while their lengths may vary individually.

FIG. 13 shows a variation of FIG. 1 in that all teeth of device 59 are the same teeth 5. FIG. 14 is a variation of FIG. 9 in that all teeth are the same teeth 5 in this device 60 also and roller 42 has longitudinal ridges 44. Further possible variations follow from FIGS. 13 and 14 in comparison to FIGS. 1 and 9 in that different teeth, e.g. 5 and 5B, may be provided on the same roller.

FIG. 15 shows a three-roller system 61 that is well known in the art per se and where all teeth 5 are the same and the logo on the driven roller is produced by omitting or modifying teeth. In contrast to the prior art, however, this embossing roller 2L has a depression S too.

FIG. 16 shows a variation of FIG. 15 in that embossing roller 2L of device 62 is provided with teeth 5B having a greater pitch in logo area 8A which are arranged to form lines 25 and lines 26.

Device 63 is shown from above in FIG. 17 and from below in FIG. 17A and shows a two-roller system as in FIGS. 1 and 1A. As only a relatively small inscription is used as logo 8 in the large logo area 8A without teeth, a synchronization of the two rollers 2L and 3 is necessary to facilitate the exchange of the foil rolls. Depression S extends over the entire circumference of roller 2L. The two rollers 2L and 3 are synchronized via gears 64, 65 and are intended for positive embossing. Both rollers have the same teeth 5, including logo 8.

As a variant of device 63 of FIGS. 17, 17A, device 63A of FIGS. 18 and 18A shows a two-roller system having two embossing rollers 2L and 3L. The two logo areas 8A provided with inscription 8 on each embossing roller extend over a circumference of 180° each and depression S also extends over a circumference of 180° so that the foil is always in a lowered area during embossing. This arrangement allows both negative and positive embossing in the same embossing operation, thereby further extending the design possibilities.

What has been said of the three-roller system according to FIGS. 2-16 analogously applies to the two-roller system according to FIGS. 17 and 18, however with the advantage of greater simplicity. If particularly difficult materials have a curling tendency after a treatment with two rollers, a following smoothing device, e.g. with smooth rubber rollers, may be used.

In FIGS. 19A-19E to 25A-25D, different embodiments of embossing rollers according to the invention are illustrated in a schematic and non-limiting manner.

Embossing rollers 2La-2Le of FIGS. 19A to 19E correspond to the driven embossing rollers of FIGS. 1, 2, 4, 5, 7, 8, 10, 11, 12, in which roller 2La according to FIG. 19A is depicted. According to FIG. 19A, teeth 5 in edge zones 9 are different from teeth 5B of lines 25 and rows 26, which have a greater pitch and serve either for decorative purposes or, in the case of wrapping foils, as reinforcements.

Furthermore, foil 7 is depicted in FIG. 19A, and it is visible that the length $S_d$ of depression S is greater than the width $7_d$ of the foil.

According to FIG. 19B, the logo area 8A is the same as in FIG. 19A whereas ridges 91 are arranged in the edge zones 9 which have the same spacing as teeth 5. In the embodiment of FIG. 19C, the edge zones 9 are formed of ridges 91 and lines 25 and rows 26 of ridges 94 having a greater spacing. In FIG. 19D, edge zones 9 are formed of rings 51 having the same spacing as that of teeth 5 whereas lines 25 and rows 26 are formed of teeth 5B as in FIG. 19A. In FIG. 19E, edge zones 9 are unstructured 52 and lines 25 and rows 26 as in FIG. 19A consist of teeth 5B.

Embossing rollers 3La, 4La-3Le, 4Le of FIGS. 20A to 20E correspond to counter-roller 3L or 4L of FIGS. 1A, 3, 6, 9, in each of which roller 3La according to FIG. 20A is depicted. The design of edge zones 9 and of logos 8, lines 25, and rows 26 is the same as in FIGS. 19A to 19E.

Embossing rollers 2Lf-2Lk of FIGS. 21A to 21E correspond to driven roller 2L of FIG. 13 where roller 2Lf according to FIG. 21A is depicted. The design of edge zones 9 is the same as in FIGS. 19A to 19E whereas lines 25 and rows 26 have the same teeth 5 as the edge zones of FIG. 19A and lines 25 and rows 26 consist of the fine ridges 91.

Embossing rollers 4La-4Le of FIGS. 22A to 22E correspond, with one exception, to counter-roller 4L of FIG. 14 where roller 4La according to FIG. 22A is depicted. The design of edge zones 9, of the logos, of lines 25, and of rows 26 is the same as in FIG. 21, with one exception. The exception relates to FIG. 22B. In this Figure, the lateral edges of teeth 5S of logos 8 are arranged at an angle of e.g. 70° with respect to the longitudinal axis of the roller and the inscription is also arranged at an angle of 70° with respect to the longitudinal axis. This angle may have any value between 1° and 89°.

Embossing rollers 2L1-2Lp of FIGS. 23A to 23E correspond to driven roller 2L of FIG. 15, with the exception of FIG. 23B. The design of edge zones 9 is the same as in FIGS. 19A to 19E. Here a negative embossing operation is performed and no lines or rows are visible in the logo area since all teeth 5 are the same and teeth are only omitted or modified in the logo. Roller 2Lm of FIG. 23B has teeth 5S whose edges include an angle of 70° with respect to the longitudinal axis, and the logo is also arranged at this angle as in FIG. 22B. In the case of roller 2Lo of FIG. 23C, the satinized background is formed of the fine ridges 91.

Embossing rollers 2Lq-2Lu of FIGS. 24A to 24E correspond to driven roller 2L of FIG. 16, with the exception of FIG. 24B. Here also a negative embossing operation is performed, and lines 25 or rows 26 are visible in the logo area that are formed of teeth 5B having a greater pitch. The remaining teeth 5, particularly those around the logo, are the same as at the edge of 24A, while the teeth of the logo are omitted or modified. Edge zones 9 are the same are before. Analogously to FIGS. 22B and 23B, both teeth 5S and teeth 5B and the inscription of FIG. 24B are arranged at an angle of e.g. 70° to the longitudinal axis.

The non-driven embossing rollers 3L1,m and 4L1,m of FIGS. 25A and 25B and the driven embossing rollers 2Lv and 2Lw show variants of logo layouts. Here the edges of FIGS. 25 A, B, and C are provided with the fine ridges 91, and edge zones 9 of FIG. 25C with teeth 5 as it is also the case with the logos. The logos of FIGS. 25B and 25D are arranged at an angle of 45°.

The foil produced by positive embossing with the embossing rollers of FIGS. 19-22 and 25 is particularly suitable for wrapping other objects than cigarettes, especially in cases where it is important that no warping occurs and an inexpensive embossing of the most diverse patterns e.g. also on white paper is desired.

In FIGS. 26 to 31, as a further application of the devices of the invention, embossed foils with logos and reinforcement zones for use as wrapping paper for boxes are shown. At the same time, these reinforcement zones also have a decorative character. The reinforcement lines and rows on the embossing rollers and thus the corresponding reinforcement zones on the foil need not comprise complete rows of teeth.

The technique of embossing small indentations or elevations according to the pinup-pinup process makes it possible to use relatively thin wrapping foils for packaging cigarette packets and boxes for high-grade goods such as watches, electronic parts, expensive pharmaceuticals, or foods such as chocolate or cheese with or without logos in the online process that are provided with reinforcement zones in critical locations, i.e. at the edges where there is a risk that the foil may be torn.

Due to the fact that the foil is embossed in these locations by means of the device of the invention, the risk of ruptures is reduced. Moreover, the very fine and accurate embossing ensures that once it has been opened, the original package cannot be reclosed without evidence. This security is enhanced when the fine logotypes and the like connect seamlessly after wrapping. In this regard it is important that the foil will not warp after cutting to size.

A foil embossed by one of the embossing rollers according to FIGS. 19 and 20 is arranged around box 30 according to FIG. 26 in such a manner that reinforcement zones 31 and 32 embossed by reinforcement lines and rows 25 and 26 are situated at the edges of the box while one or several sides may be provided with logos 8.

The wrapping foil for boxes 33 and 34 of FIGS. 27 and 28 has been embossed by one of the embossing rollers of FIGS. 21 and 22 and is also provided with reinforcement lines and rows 31 and 32. In FIG. 27, a wrapping foil around a triangular box 34 is shown as a variant whose reinforcement zones

31 and 32 and logos 8 have been embossed by an embossing roller that corresponds to the embossing roller according to FIG. 13 or 14. Furthermore, in FIG. 28, one side is provided with satinizing pattern 8S as an example.

The wrapping foil for box 35 according to FIG. 29 has satinized areas 8S and a logo 8 that has been produced on one of the embossing rollers according to FIGS. 15 and 23. In this example, no reinforcement lines or rows are visible.

The wrapping foil for boxes 36 and 37 of FIGS. 30 and 31 has been embossed by one of the embossing rollers of FIG. 24 and is also provided with reinforcement lines and rows 31 and 32. In FIG. 30, a wrapping foil around a triangular box 36 is shown as a variant whose reinforcement zones 31 and 32 and logos 8 have been embossed by an embossing roller that corresponds to the embossing roller according to FIG. 16 or 24. The foil on box 37 of FIG. 31 has also been embossed by an embossing roller according to FIGS. 16 and 24. In addition to logos 8 and reinforcement zones 32, 32, the wrapping foils are provided with a satinizing pattern 8S.

All the disclosed rollers are also suitable for embossing innerliners for cigarettes or packaging foils for other goods.

The invention claimed is:

1. A foil embossing device, comprising at least one embossing roller, and at least one counter-roller, one of the embossing roller and the counter-roller being driven via a drive and the embossing roller and the counter-roller having a configuration where teeth, rings, or ridges project from a base cylinder, at least the embossing roller having teeth that project from the base cylinder, wherein in order to achieve a uniform embossing of a foil across an entire width of the foil, independently of a kind and a number of teeth or ridges in a logo area of the embossing roller and of a kind of the foil, the embossing roller comprises a first edge zone, a second edge zone, and a depression between the first and second edge zones, the depression extending over the logo area, the depression having a depth relative to the first and second edge zones that has a value between 0.02 to 0.20 mm over an axial length that is at least a same as a width of the foil to be embossed, or exceeds the width of the foil to be embossed.

2. The device according to claim 1, with one embossing roller, wherein the depression extends over the entire circumference of the embossing roller.

3. The device according to claim 1, with two embossing rollers, wherein the depression extends over half the circumference of each of the two embossing rollers complementarily.

4. The device according to claim 1, wherein the first and second edge zones are on both sides of the depression and are always in engagement or in contact, respectively, with the teeth, rings, or ridges of the counter-roller(s).

5. The device according to claim 1, wherein the logos of the embossing roller represent at least one inscription that is composed of individual teeth or formed by omitting or modifying teeth.

6. The device according to claim 4, wherein a logo of the embossing roller includes reinforcement lines and reinforcement rows that are formed of individual teeth or ridges, one type of teeth having a greater spacing than an other type of teeth.

7. The device according to claim 4, wherein the edge zones have teeth, ridges, and circumferential rings, or no teeth.

8. The device according to claim 1, wherein the embossing roller is linked to the counter-rollers by synchronizing means.

9. The device according to claim 1, wherein the counter-roller is provided with individual teeth or with circular ridges or longitudinal ridges, the ridges being flattened and their cross-section tapering outwardly, or the counter-roller having a smooth surface.

10. The device according to claim 1, wherein the teeth of the embossing roller for embossing logos are pyramidal with a rectangular or square horizontal projection or conical with a round cross-section, and the edges of the pyramidal teeth are arranged either orthogonally to a longitudinal axis of the embossing roller or at an angle of between 1° and 89° thereto.

11. The device according to claim 1, wherein at least one of the embossing roller and the counter-roller is journalled so as to be capable of an excursion in a longitudinal direction of the axle and/or in a direction of a contact pressure and/or in a travelling direction of a material being embossed.

12. The device according to claim 1, wherein the embossing roller and the counter-roller are journalled without being capable of an excursion.

13. The device according to claim 1, wherein individual teeth of the embossing roller are modified in height or shape in order to produce embossed signs whose appearance varies depending on the viewing angle and the lighting conditions.

14. A method for producing a foil for wrapping an object using the device according to claim 1, wherein the embossing roller includes teeth arranged so as to form reinforcement lines and rows, the method comprising:

providing a foil to the foil embossing device, passing the foil between the embossing roller and the counter-roller to produce a wrapping foil having reinforcement zones embossed by the teeth, and cutting the wrapping foil to size such that the reinforcement zones of the wrapping foil are situated at edges of the object.

15. The device according to claim 1, wherein the base cylinder of the embossing roller comprises the depression.

16. The device according to claim 1, wherein the base cylinder includes a first portion and a second portion, the second portion having a diameter that is smaller by 0.02 to 0.20 mm over its axial length than a diameter of the first portion.

17. The device according to claim 1, wherein the first edge zone and the second edge zone are located on a periphery of the embossing roller.

* * * * *